United States Patent [19]

Hashimoto et al.

[11] 4,382,864
[45] May 10, 1983

[54] PROCESS FOR DEWATERING SLUDGES

[75] Inventors: Masanori Hashimoto, Yamato; Yasuhiko Ishii, Tokyo; Yasuhiro Ohi, Kokubunji, all of Japan

[73] Assignee: Kurita Water Industries Ltd., Osaka, Japan

[21] Appl. No.: 287,453

[22] Filed: Jul. 27, 1981

[30] Foreign Application Priority Data

| Aug. 8, 1980 | [JP] | Japan | 55-108213 |
| Jan. 28, 1981 | [JP] | Japan | 56-11364 |
| Feb. 6, 1981 | [JP] | Japan | 56-15806 |
| Feb. 7, 1981 | [JP] | Japan | 56-16296 |
| Feb. 9, 1981 | [JP] | Japan | 56-16867 |
| Feb. 12, 1981 | [JP] | Japan | 56-19330 |

[51] Int. Cl.³ .................................................. C02F 11/14
[52] U.S. Cl. .................................. 210/727; 210/730; 210/731; 210/738
[58] Field of Search ........ 210/725, 727, 728, 730–736, 210/609, 738

[56] References Cited

U.S. PATENT DOCUMENTS

| 3,165,465 | 1/1965 | Ray et al. | 210/727 |
| 3,259,570 | 7/1966 | Priesing et al. | 210/53 |
| 3,338,828 | 8/1967 | Clark | 210/730 |
| 3,377,274 | 4/1968 | Burke et al. | 210/727 |
| 3,397,139 | 8/1968 | Sak | 210/727 |
| 3,533,940 | 10/1970 | Peniston et al. | 210/728 |
| 3,617,568 | 11/1971 | Ries, Jr. | 210/727 |
| 4,105,558 | 8/1978 | Heinrich et al. | 210/401 |

FOREIGN PATENT DOCUMENTS

| 40-2648 | of 0000 | Japan . | |
| 51-33867 | 9/1976 | Japan | 210/609 |
| 967607 | 8/1964 | United Kingdom . | |
| 1310491 | 3/1973 | United Kingdom | 210/727 |
| 1454925 | 11/1976 | United Kingdom | 210/609 |

Primary Examiner—Peter A. Hruskoci
Attorney, Agent, or Firm—Flynn, Thiel, Boutell & Tanis

[57] ABSTRACT

A process for dewatering sludges, which comprises performing a first stage agitation of the sludge to be dewatered during addition of a first high molecular weight flocculant developing in an aqueous solution an electric charge in polarity opposite to that of the sludge to effect neutralization of the electric charge of the sludge, conducting subsequently a second stage agitation of the sludge during a further addition of a second high molecular weight flocculant developing in an aqueous solution an electric charge in polarity opposite to that of said first flocculant to cause flocculation of the sludge and subjecting the so flocculated sludge to a dewatering operation, wherein a flocculant composed of a natural high molecular organic compound or a derivative thereof is used for at least one of said first and second flocculants with simultaneous employment of high power agitation for said first stage agitation, which process obtain a dewatered cake having low moisture content with efficient dewatering of the sludge.

11 Claims, 17 Drawing Figures

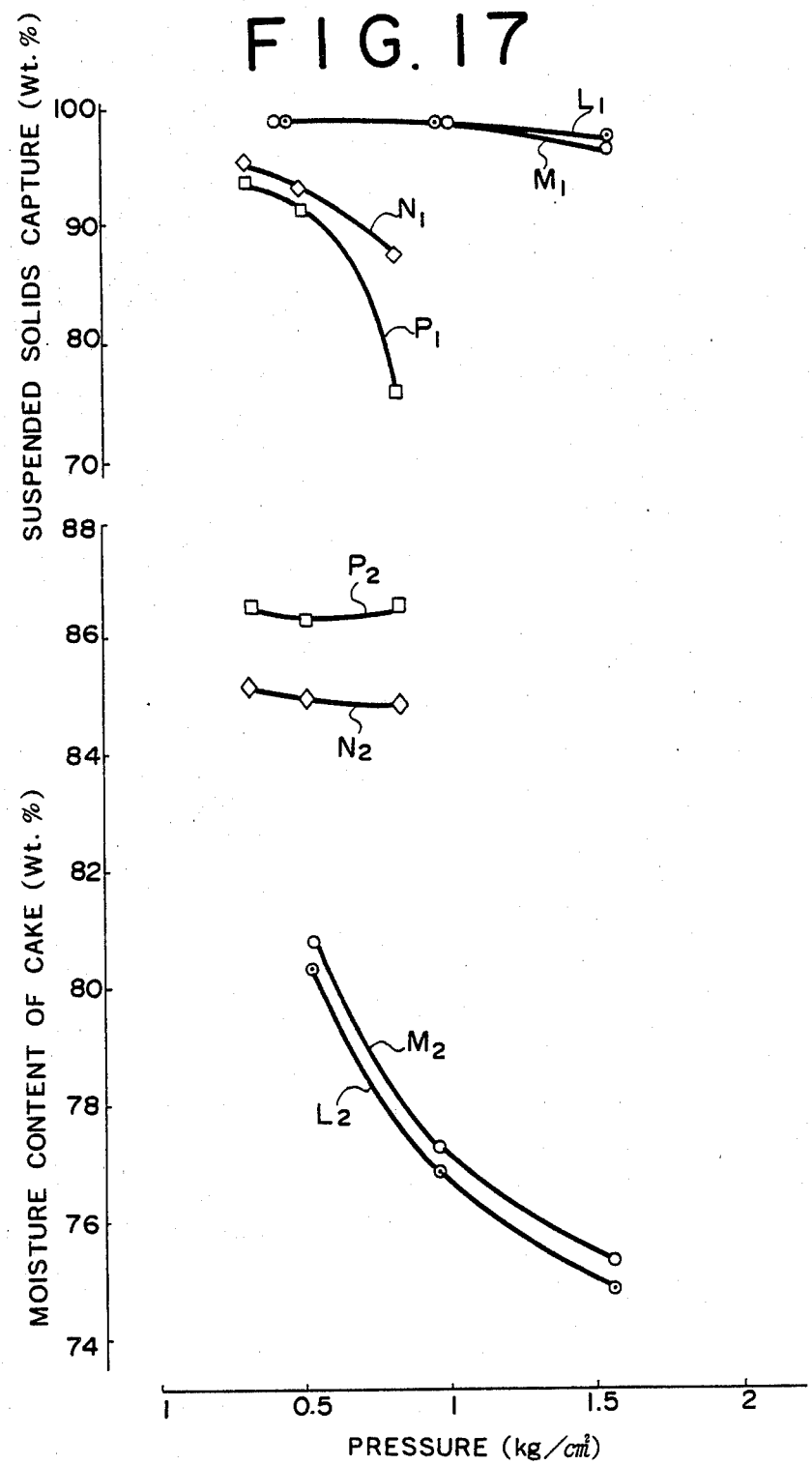

PROCESS FOR DEWATERING SLUDGES

BACKGROUND OF THE INVENTION

1. Field of the Invention

The present invention relates to a process for dewatering sludges, especially for dewatering sewage sludges by the formation of flocs caused by addition of flocculant to the sludges.

2. Description of the Prior Art

There has been known a process for dewatering sludges in which a sludge such as surplus activated sludge, sludge from alum coagulation, and so on, is first treated by adding thereto a first high molecular weight flocculant of cationic or anionic nature having an electric charge of polarity opposite to that of the sludge while agitating the sludge and then, adding thereto a second high molecular weight flocculant of anionic or cationic nature having an electric charge of polarity opposite to that of said first flocculant. The thus-formed flocs are then subjected to a dewatering operation.

This prior process thus consists in first forming a primary floc by neutralizing the electric charge of the sludge by addition of a first high molecular weight flocculant, and then causing formation of giant flocs by addition of a second high molecular weight flocculant, before carrying out the dewatering operation. This process attains a better dewatering performance due to the formation of giant stout flocs, even for a sludge that will merely form small and feeble flocs upon addition of either an anionic or cationic high molecular weight flocculant only. This prior process exhibits, however, narrow permissible ranges for the amounts of addition of both the cationic and anionic high molecular weight flocculants, in addition to a narrow permissible range of the dosage ratio between both flocculants, so that regulation and control in practical applications where the variations in the concentration and properties of the sludge are considerable, are substantially difficult. Moreover, the process shows a further shortcoming in that, although the flocs formed are large and stout, they form a tenacious dewatered cake and in addition, the moisture content of the dewatered cake from this process is high as compared with that of a cake obtained by the sole addition of a cationic or anionic flocculant, so that the filtration velocity is decreased.

BRIEF SUMMARY OF THE INVENTION

It is therefore an object of the present invention to provide a process for dewatering sludges having wider permissible ranges both for the amount of addition of the two flocculants and for the dosage ratio between them, by eliminating the shortcomings of the prior process mentioned above.

Another object of the present invention is to provide a process for dewatering sludges in which efficient dewatering can be realized by formation of flocs showing better dewatering ability, so as to lower the moisture content of the dewatered cake.

Still another object of the present invention is to provide a process for dewatering sludges in which the amount of suspended solids removed can be increased.

A further object of the present invention is to provide a process for dewatering sludges in which efficient press filtration under a high squeezing pressure can be achieved.

A still further object of the present invention is to provide a process for dewatering sludges in which the bulk volume of the dewatered cake can be decreased.

Another object of the present invention is to provide a process for dewatering sludges in such an energy efficient manner that the amount of supplemental fuel needed for combustion of the dewatered cake is decreased.

These and other objects of the present invention will appear more clearly from the following specification taken in conjunction with the accompanying drawings.

The process for dewatering sludges according to the present invention comprises conducting a first stage dewatering comprising agitating of the sludge to be dewatered while adding a first high molecular weight flocculant that develops on an aqueous solution an electric charge of polarity opposite to that of said sludge, performing subsequently a second stage dewatering comprising agitating the sludge while adding a second high molecular weight flocculant develops in an aqueous solution an electric charge of polarity opposite to that of said first flocculant, and thereafter subjecting the flocs thus formed to a dewatering operation, wherein at least one of said first and second flocculants is a flocculant consisting of a natural high molecular weight organic compound or a derivative thereof.

The first stage agitation of the process according to the present invention is performed preferably with a stronger agitation intensity than that employed in conventional flocculation in sewage work, while the second stage agitation may be carried out in an ordinary manner.

For practical dewatering operations, centrifugation, vacuum filtration and press filtration can be employed, but it is not preferable to employ, press filtration with a filter cloth under pressure of at least 1 kg/cm$^2$.

BRIEF DESCRIPTION OF THE DRAWINGS

FIGS. 1 to 17 are graphs showing the experimental results obtained respectively in Examples 1 to 5 and 13 to 20.

DETAILED DESCRIPTION OF THE INVENTION

Figure 1:
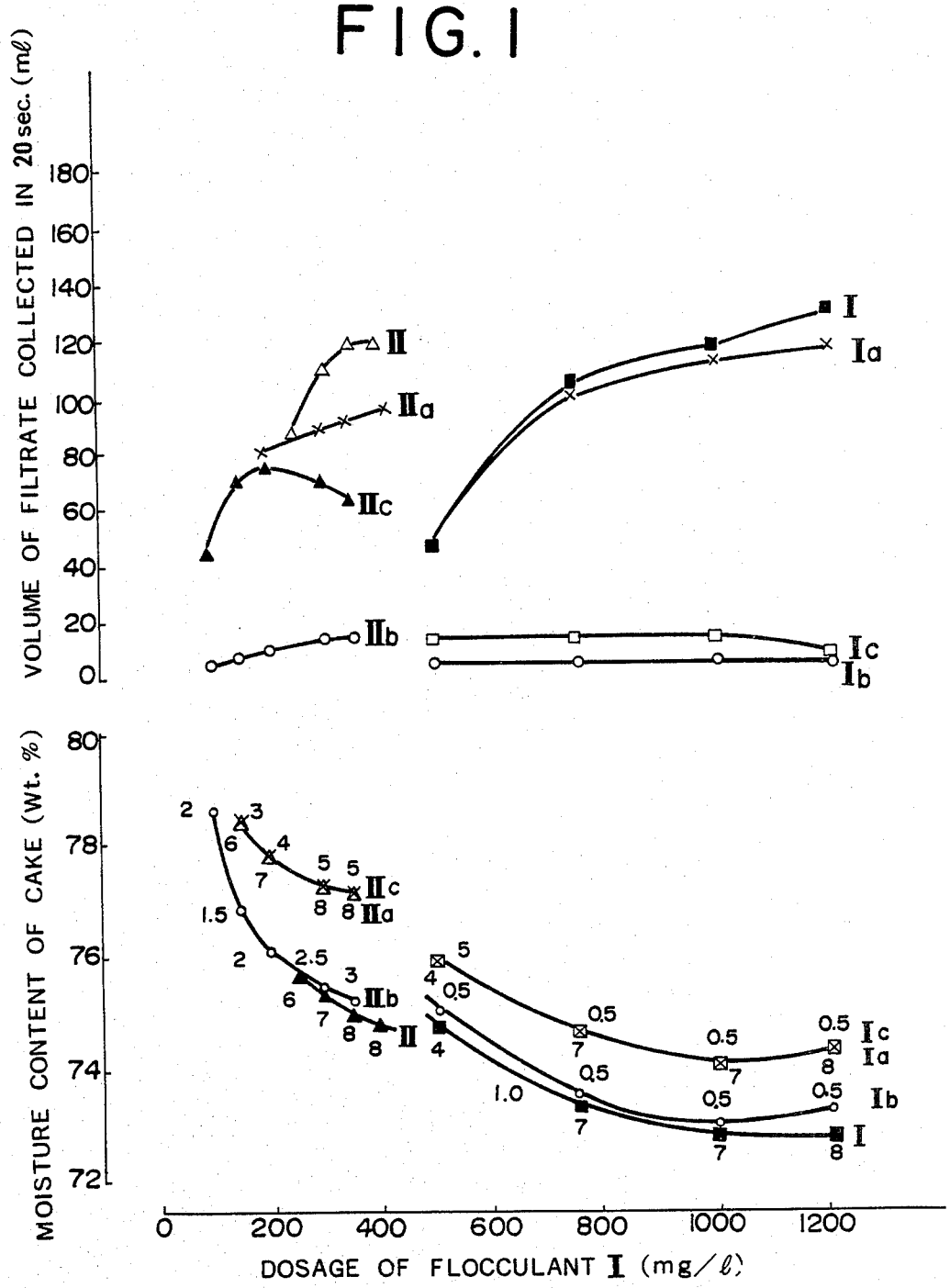

The sludges which can be treated by the process according to the present invention include all kinds of sludges.

Primarily settled sewage sludge, excess activated sludge, digested sludge and the like, which contain relatively greater amounts of organic substances, are in general anionic in nature, whereas sludges containing relatively large amounts of metal hydroxides, such as Alum coagulation sludge and inorganic sludges, exist in general in a cationic state. The ionic polarity of such sludges may be determined using, for example, a zeta meter.

The first high molecular weight flocculant (referred to hereinafter as flocculant I) to be added initially to the sludge to be dewatered is one which will develop an electric charge in an aqueous solution of polarity opposite to that of the sludge. Thus, for example, a flocculant of cationic nature is added to an anionic sludge and vice versa. The second high molecular weight flocculant (hereinafter referred to as flocculant II) has an electric charge in an aqueous solution of polarity opposite to that of flocculant I, so that an anionic flocculant is employed as flocculant II when using a flocculant I of a cationic nature has been used in the first stage, and vice versa.

According to the present invention, at least one of said flocculants I and II should be a flocculant consisting of a natural high molecular weight organic compound or a derivative of such a compound.

Examples of such natural high molecular weight organic compounds and derivatives thereof include, as those of anionic nature, carboxymethyl cellulose, sodium alginate and carboxymethyl starch, and as those of cationic nature, cationized starch, cationized cellulose, cationized guar gum and chitosan.

These natural high molecular organic compounds and derivatives thereof can be used either for the flocculant I or for the flocculant II in the process according to the present invention. It is also permissible to use such natural high molecular organic compounds and derivatives thereof for both the flocculants I and II. If a natural high molecular organic compound or a derivative thereof is used for one of the flocculants I and II, a synthetic high molecular weight flocculant can be used for the other one. It is possible also to use such a natural high molecular compound in a mixture with a synthetic high molecular weight flocculant.

For the synthetic high molecular weight flocculants which can be used in the process according to the present invention, those which have conventionally been employed can be used, such as polyacrylic acid and salts thereof, partially hydrolyzed polyacrylamide, and so on for those of anionic nature and, for example, homopolymers of aminoalkyl (meth)acrylates and copolymers thereof with other monomers, Mannich-reaction polyacrylamide, Hofmann-degradated products of polyacrylamide, polyamidepolyamines, polyvinyl imidazoline, polyethyleneimine, salts of polydialkyldiallylammonium, and so on for those of cationic nature. Such synthetic flocculants can be used either alone or in a mixture of two or more of them.

Among the high molecular weight flocculants enumerated above, as for the natural high molecular organic compounds and their derivatives, carboxymethyl cellulose and chitosan have been shown to be highly effective and, in particular, chitosan is most preferable.

In employing chitosan as the natural high molecular organic compound, it is particularly effective to employ polyacrylic acid or a salt thereof as the other high molecular weight flocculant of anionic nature.

Chitosan can be obtained from the cuticle of crustaceans such as crab, lobster and so on by deacetylation. While chitosan in itself is insoluble in water, it can be rendered water-soluble by converting it into a salt of an organic or inorganic acid (excluding sulfuric acid). Therefore, chitosan is used in the process according to the present invention in the form of a water-soluble salt of an organic or inorganic acid. Examples of water-soluble inorganic and organic acid salts of chitosan are formate, acetate, hydrochloride, nitrate and so on. For practical use, a water-soluble salt of chitosan per se can be admixed to the sludge, but it is preferable, for the sake of easy handling and prompt and homogeneous distribution over the entire bulk of the sludge, to use it in a form of an aqueous solution.

As examples of polyacrylates, polyacrylic acid, sodium polyacrylate, potassium polyacrylate and so on can be employed, preferably in a form of aqueous solution in the same manner as chitosan. For polyacrylic acid and salts thereof, conventional products used hitherto as flocculants may be employed, which may have an intrinsic viscosity of about 1–15 [dl/g] determined at 30° C. using 2N-aqueous solution of sodium hydroxide as solvent.

While the dosages of the high molecular weight flocculants may vary according to the properties of the sludge, such as the pH value, content of suspended solids (hereinafter abbreviated as SS), content of volatile suspended solids (abbreviated hereinafter as VSS), electric conductivity and so on, a dosage of about 0.2–3% by weight, based on the amount of SS, for an organic high molecular weight flocculant of anionic nature and a dosage of about 0.5–6% by weight, based on the amount of SS, for an organic high molecular weight flocculant of cationic nature may generally be adopted.

For effecting flocculation, the sludge to be dewatered is treated such that, first, the flocculant I is added to the sludge and the sludge is subjected to the first stage agitation so as to neutralize the ionic charge of the sludge, and then the flocculant II is added thereto and the sludge is subjected to the second stage agitation so as to cause flocculation of the sludge. While it is permissible, to carry out the first stage agitation with an ordinary agitation strength, i.e. an intensity of mixing which permits formation of large size flocs, a better dewatering performance will be achieved with simultaneous attainment of a decrease in moisture content of the dewatered cake if the first stage agitation is carried out with an intensity powerful enough to form small size flocs, especially in case a flocculant of greater molecular weight is used for the flocculant I. The second stage agitation can be performed at an ordinary strength.

The strength of agitation in the first stage agitation is preferably chosen so that no flocculation occurs or only flocs having floc sizes not greater than 2 mm will be formed, whereby the electric charge of the sludge can be neutralized.

Since the conventional two stage flocculation process has exclusively aimed at formation of flocs having floc diameters as large as possible, the flocs formed in the first stage agitation by the addition of the first flocculant are intended to have a size considerably greater than in the present invention, in order that in the second stage there will be attained a greater floc size by the addition of the second flocculant. However, the thus produced flocs have shown a dewatering performance which renders them unsuitable for dewatering by, squeezing or the like, though they show a superior settling property due to large floc size. Thus, the flocs remain internally still in an unreacted state with the electric charge not yet neutralized, retaining a large amount of moisture, so that the internal moisture of the flocs is difficult to remove by squeezing or the like. The fact that there was no marked difference in the dewatering ability between the sludge obtained by the two-stage flocculation technique and the sludge obtained by the single stage flocculation may be attributed to the above reason.

In contrast thereto, in the process according to the present invention, the electric charge of the sludge is neutralized internally by employing a powerful agitation in the first stage after the addition of the flocculant I, so that the dewatering performance can considerably be increased by the second flocculation effected by the addition of the flocculant II. In order to achieve a neutralization of the electric charge of the sludge, it is preferable that no flocculation occurs during the first stage agitation after the addition of flocculant I or, even if flocculation occurs, the thereby formed flocs have a size not greater than 2 mm. Therefore, the first stage agitation should be carried out, as indicated above, with greater strength than that employed ordinarily for attaining flocculation.

After the neutralization of electric charge has been effected as above, the flocculant II is added thereto and the second stage agitation is performed so as to cause flocculation to occur. Here, the condition of agitation may be the ordinary agitation required for causing flocculation. By conducting such an agitation, the particles of the sludge which have been subjected to the neutralization of the charge by reacting with the flocculant I will now come together to cause flocculation, so that giant and stout flocs are formed, resulting in a considerable increase in the dewatering performance.

There is, however, no restriction as to the manner of agitation for both the first and the second stage agitations. Thus, it is possible to employ agitations by an impeller installed in a mixing vessel, agitation by flowing through a conduit system or agitation using a circulating pump such as a centrifugal pump, etc. As a measure of the intensity of agitation, in a mixing vessel equipped with a vane stirrer, a peripheral speed of the stirring vane of 1–5 m/sec. is employed for the strong agitation and a peripheral speed of 0.1–0.5 m/sec. is employed for ordinary agitation.

In the process according to the present invention, the flocculant I is introduced in the suction side of the pump that transports the sludge into the dewatering device to thereby attain an intense agitation by the pump so as to effect a thorough reaction over the entire bulk of the sludge to neutralize the electric charge of the sludge. The addition of the flocculant II makes it possible to form a floc with improved dewatering performance.

As for the pump, those of the "moyno type", which is known also as "snake pump" or "mohno pump", and those of bladeless type are most suitable, though there is no special restriction as to the pump that is used.

The flocculated sludge formed through the use of a natural high molecular organic compound or its derivative as at least one of the flocculants I and II is large in size and shows a low tenacity with an unsticky dry touch, so that it also exhibits low adhesive property to the filter cloth, resulting in an excellent dewatering performance upon filtration.

In contrast thereto, the flocculated sludge obtained by the use of synthetic high molecular weight flocculant for both the flocculants I and II is very tenacious, with higher adhesion onto the filter cloth, resulting in a dewatering performance which is inferior as compared with the former flocculated sludge.

If sulfate ion is contained in the sludge to be dewatered, the floc formed by using chitosan, polyethyleneimine and so on for the flocculant I will have a smaller size and the flocculating function becomes worse. In this case, the flocculating function is improved when an alkaline earth compound, such as chloride, nitrate and so on (excluding sulfate) or hydroxide of calcium, magnesium or barium, is added to the sludge. The amount of alkaline earth compound added should be at least 0.2 equivalent with respect to the sulfate ion and preferably about 1 equivalent or more. The flocculation is achieved either in a manner such that the alkaline earth compound is added to the sulfate-containing suspension and agitation is carried out before the addition of the flocculants, or in a way such that the alkaline earth compound is added at the same time as the flocculant and subsequently agitation is conducted to attain flocculation. It is permissible to add the alkaline earth compound and the flocculant either separately or simultaneously in a form of a mixture. The alkaline earth compounds exemplified above can be used alone or in combinations of them.

The thus-formed floc is transferred as is, or after the removal of the separated water, to a dewatering device to effect dewatering in a known manner. For practical dewatering, centrifugation, vacuum filtration and squeezing may be employed. As the dewatering device to effect these dewatering techniques, those which have already been adopted can be employed, such as, for example, a centrifuge, a vacuum filter, a dehydrator of the belt press type, a screw press and a filter press. When using a belt press type dehydrator with a filter cloth, a squeezing pressure of more than 1 kg/cm$^2$ can be achieved by the process according to the present invention, in contrast to the prior process in which a squeezing pressure of more than 0.5 kg/cm$^2$ has never been used owing to the poor exfoliative property of the retained cake to the filter cloth, and due to the possible protrusion of the cake from the filter cloth edges. Thus, according to the process of the present invention, a dewatered cake having a low moisture content, which is dependent on the squeezing pressure, can be obtained.

The flocculated sludge may be supplied as is or after the removal of the separated water layer to a squeezing dehydrator having a filter cloth to effect dewatering, by squeezing under a pressure of 1 kg/cm$^2$ or more. While there is no restriction as to the construction of the squeezing dehydrator, it may be preferable to employ a squeezing dehydrator of the belt press type, in which two sheets of filter cloth each having the form of endless belt are moved in parallel while the sludge to be dewatered is held therebetween and the cloths are pressed from the outside by rollers. The squeezing pressure in a belt press type squeezing dehydrator having two travelling filter cloths supported on rollers can be calculated by the equation:

Squeezing Pressure (kg/cm$^2$) = $[F/(r+d)] \times [L_1/L_2]$, wherein F represents the tensile force (kg/cm) of the filter cloth, r indicates the radius (cm) of the roller, d denotes the thickness (cm) of the cake, $L_1$ is the width (cm) of the filter cloth and $L_2$ is the width (cm) of the cake.

The dewatered cake obtained by the process according to the present invention is then disposed of by, for example, incineration or composting. Due to its low moisture content, it offers the advantages that the amount of supplementary fuel needed for the incineration can be minimized and that the additives for regulating the moisture content in the composting can be spared.

The sludge dewatering process according to the present invention offers many advantages, for example:
  (a) attainment of decreased moisture content of the dewatered cake,
  (b) increase of the sludge dewatering rate,
  (c) higher capture rate of SS,
  (d) better exfoliative nature of the dewatered cake from the filter cloth upon employment of a belt press type or filter press type dehydrator, enabling an increase of the capture yield of SS while achieving a further reduction of the moisture content by use of high pressure squeezing, (e) attainment of a wider range of permissible amounts for both the flocculants I and II with simultaneous achievement of a wider permissible range of the dosage ratio of the two flocculants, permitting an easier regulation of dosages in practical application, (f) achieving reliable flocculation with invariable formation of flocs capable of easy dewatering, by simply regulating the dosage for the kind of sludge treated.

DESCRIPTION OF THE PREFERRED EMBODIMENT

Example 1

To 200 ml of a mixed sludge composed of a primarily settled sewage sludge and excess activated sludge, having a content of SS of 2.28%, a proportion of VSS (which corresponds to the portion of organic substances in the SS and is determined by measuring the burning loss of the dried SS after burning it at 600° C.) in the SS of 69% and showing a pH of 5.6 and an electric conductivity of 2180 μS/cm, there was added a flocculant selected from the group of the flocculants I given in Table I in varying amounts and the first stage agitation was carried out under conditions indicated in Table I. Then, a flocculant selected from the group of flocculants II also recited in Table I was added to the sludge and the second stage agitation was effected as stated in Table I. The sludge thus flocculated was poured in a Büchner funnel covered with a 100-mesh nylon filter cloth and the volume of filtrate collected in 20 seconds was determined (Nutsche test). 15 g of the thus-filtered sludge (filter cake) were placed between a filter cloth to be used for belt press filtration and a layer of a sponge, to effect squeezing under a pressure of 0.5 kg/cm² for two minutes (press test). The cake after this press test was examined for its moisture content.

The flocculants employed in Examples 1 to 6 are summarized in Table II.

The intense agitation was carried out using a hand-mixer having two beaters such, that the mixer was operated at a rate of revolution of 500 rpm for 30 seconds, whereas the ordinary agitation was performed using a handmixer having only one beater operating at a rate of revolution of 250 rpm for 20 seconds. For comparison, a similar test was carried out wherein flocculants I only were used.

Results obtained are shown in FIG. 1, in which the numerals beside each plot point represent the floc size in mm. The volume of filtrate collected in 20 seconds for the test No. Ib was observed to be lower than 10 ml and that for the test No. IIb was recognized to be lower than 20 ml.

TABLE I

| Test No. | Flocculants I* | 1st Stage Agitation | Flocculants II* | Dosage (mg/l) | 2nd Stage Agitation |
|---|---|---|---|---|---|
| I   | DAM 1.0 | intense  | CMC | 150 | ordinary |
| Ia  | DAM 1.0 | ordinary | CMC | 150 | ordinary |
| Ib  | DAM 1.0 | intense  | —   | —   | —        |
| Ic  | DAM 1.0 | ordinary | —   | —   | —        |
| II  | DAM 3.8 | intense  | CMC | 150 | ordinary |
| IIa | DAM 3.8 | ordinary | CMC | 150 | ordinary |
| IIb | DAM 3.8 | intense  | —   | —   | —        |
| IIc | DAM 3.8 | ordinary | —   | —   | —        |

*See Table II

TABLE II

| Abbr. | Compound | CE-Value | Viscosity Value |
|---|---|---|---|
| CTS | Acetic acid salt of chitosan | 4.2 meq/g | 80 cP (0.5% aq. soln.) |
| PEI | Polyethyleneimine | | M.W. = 100,000 |
| DAM 1.0 | Homopolymer of dimethyl-aminoethyl methacrylate quaternized with methyl chloride | 4.81 meq/g | $[\eta]_{1N-NaCl}^{30°C} = 1.0$ |
| DAM 2.7 | Homopolymer of dimethyl-aminoethyl methacrylate quaternized with methyl chloride | 4.81 meq/g | $[\eta]_{1N-NaCl}^{30°C} = 2.7$ |
| DAM 3.8 | Homopolymer of dimethyl-aminoethyl methacrylate quaternized with methyl chloride | 4.81 meq/g | $[\eta]_{1N-NaCl}^{30°C} = 3.8$ |
| DAM 5.0 | Homopolymer of dimethyl-aminoethyl methacrylate quaternized with methyl chloride | 4.81 meq/g | $[\eta]_{1N-NaCl}^{30°C} = 5.0$ |
| DAM/AAm | 1:1 copolymer of acrylamide and dimethylaminoethyl methacrylate quaternized with methyl chloride | 3.6 meq/g | $[\eta]_{1N-NaCl}^{30°C} = 10.4$ |
| DDA | Homopolymer of di-methyldiallylammonium chloride | 5.83 meq/g | $[\eta]_{1N-NaCl}^{30°C} = 1.2$ |
| CMC | Carboxymethyl cellulose | −3.21 meq/g | $[\eta]_{1N-NaCl}^{30°C} = 14.6$ |
| PAA 13.3 | Partially hydrolyzed product of polyacrylamide | −3.52 meq/g | $[\eta]_{1N-NaCl}^{30°C} = 13.3$ |
| PAA 15.3 | Partially hydrolyzed product of polyacrylamide | −3.82 meq/g | $[\eta]_{1N-NaCl}^{30°C} = 15.3$ |
| PAA | Partially hydrolyzed | −2.73 | $[\eta]_{1N-NaCl}^{30°C} = 17.5$ |

TABLE II-continued

| Abbr. | Compound | CE-Value | Viscosity Value |
|---|---|---|---|
| 17.5 | product of polyacrylamide | meq/g | |

From the results shown in FIG. 1, it is made clear that the process according to the present invention is superior both in the moisture content of the cake and in the filtrate yield as compared with cases utilizing only the flocculant I. In the case of sole addition of flocculant I with intense agitation, the moisture content of cake was decreased, but the floc size became small, so that the yield of filtrate remained low. It is thus shown, that better results may be obtained by intense agitation for the first stage agitation.

EXAMPLE 2

Using the same sludge as in Example 1, Nutsche tests and press tests were carried out with flocculants shown in Table III under the same conditions as in Example 1.

TABLE III

| Test No. | Flocculant I | Dosage (mg/l) | 1st Stage Agitation | Flocculant II | 2nd stage Agitation |
|---|---|---|---|---|---|
| III | PEI | 600 | intense | CMC | ordinary |
| IIIa | PEI | 600 | intense | PAA 17.5 | ordinary |

Figure 2:
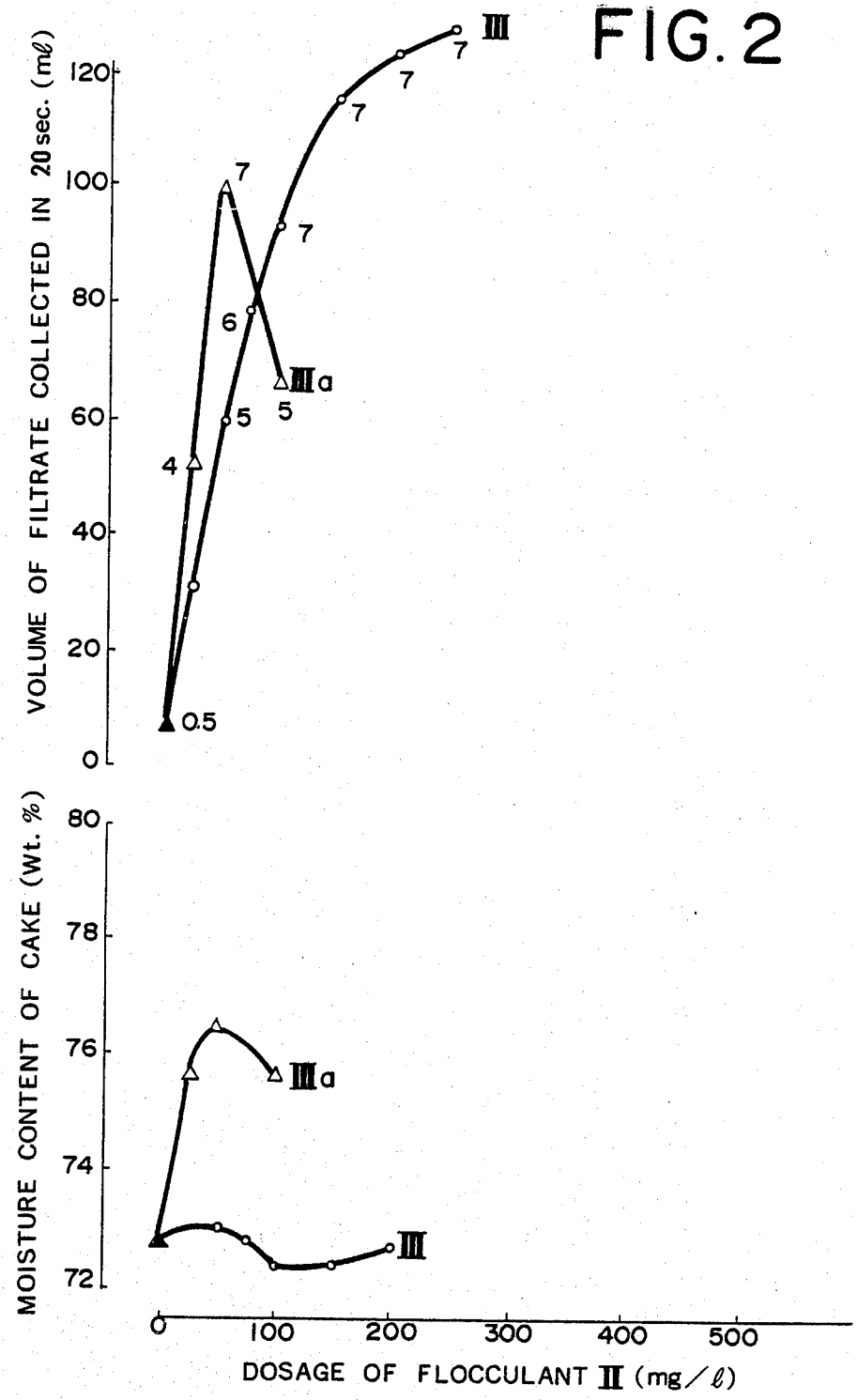

The results obtained are given in FIG. 2 in graphic illustrations.

The results indicate that the process according to the present invention attained a moisture content of dewatered cake about 4% lower than that resulting from the use of a synthetic high molecular weight flocculant for the flocculant II. Also the filtrability of flocculated sludge of the process according to the present invention was superior, since it showed less stickiness. Moreover, it can be seen that the process according to the present invention offers a wide permissible range of dosages for the flocculant II with stabilized filtrability.

Example 3

Figure 3:
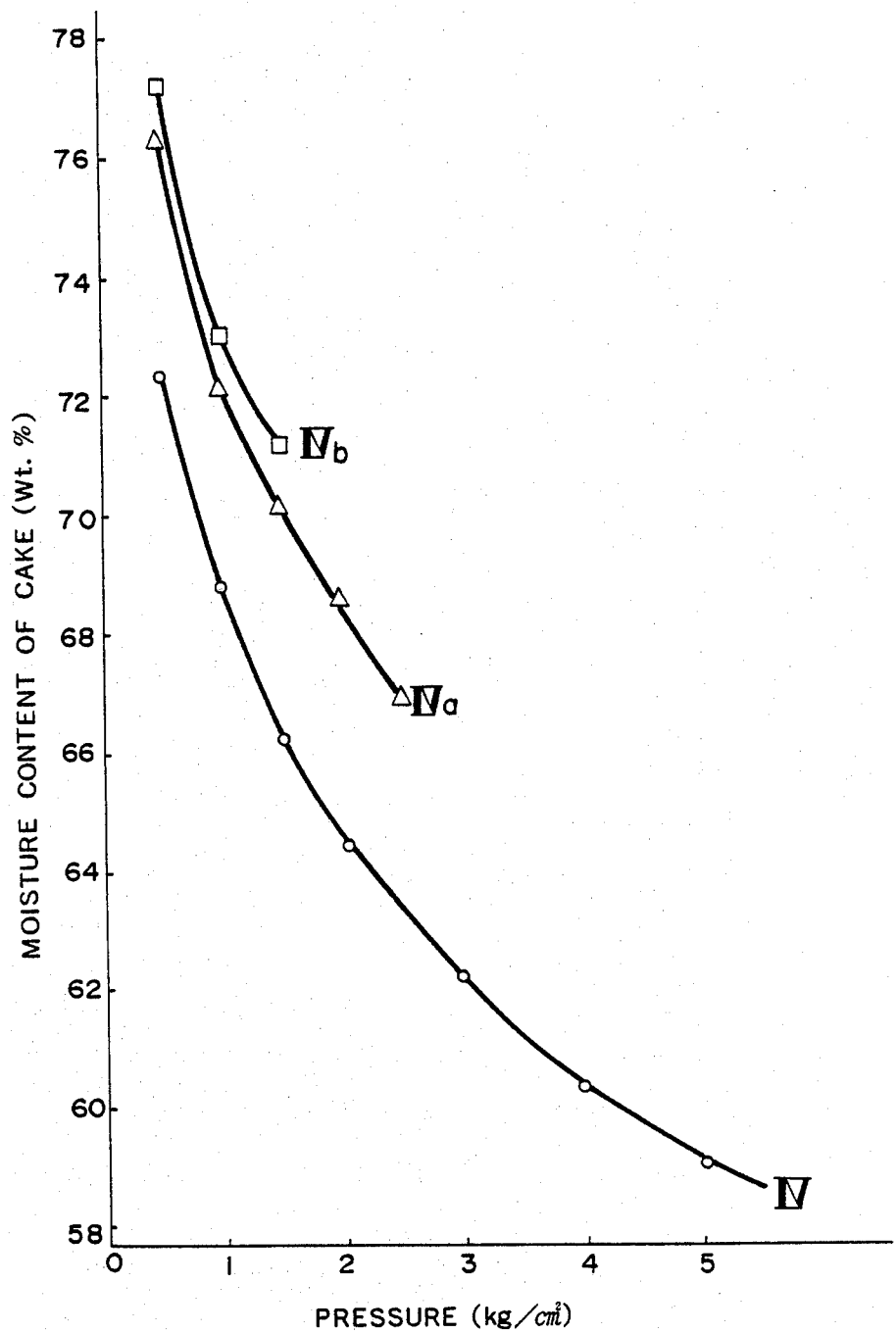

Using the sludge employed in Example 1 and flocculants given in Table IV, press tests were carried out with varying agitation conditions as given in Table IV, otherwise under the same condition as in Example 1 at various squeezing pressures. The relationship between the pressure and the moisture content, where the weight ratio of the amount of wet cake cleared off from the filter cloth spontaneously upon peeling off of the cloth to the total amount of wet cake (exfoliation index) is not reduced below 95%, is shown as a graph in FIG. 3. The dewatered cakes in the region beyond the right hand ends of the curves IVa and IVb of FIG. 3 could not be subjected to the squeezing dewatering operation, due to the insufficient strength of the dewatered cake and due to the inferior exfoliative aspect of the cake.

TABLE IV

| Test No. | Flocculant I | Dosage mg/l | 1st Stage Agitation | Flocculant II | Dosage mg/l | 2nd Stage Agitation |
|---|---|---|---|---|---|---|
| IV | PEI | 600 | intense | CMC | 150 | ordinary |
| IVa | PEI | 600 | intense | PAA 17.5 | 50 | ordinary |

TABLE IV-continued

| Test No. | Flocculant I | Dosage mg/l | 1st Stage Agitation | Flocculant II | Dosage mg/l | 2nd Stage Agitation |
|---|---|---|---|---|---|---|
| IVb | DAM 3.8 | 300 | ordinary | — | — | — |

The results indicate that the flocculated sludge treated by the process according to the present invention allows squeezing up to a high pressure far beyond that allowable for the sludges flocculated by IVa or IVb, so as to reach a low moisture content of the dewatered cake.

Example 4

An excess sludge from an activated sludge treatment of paper and pulp mill waste water, which had a content of SS of 2.98% with VSS proportion of 92.7%, a pH of 6.0 and an electric conductivity of 2,230 $\mu$S/cm, was treated by flocculation under the conditions given in Table V, and the so-flocculated sludge was then subjected to the Nutsche test and press test under the same conditions as in Example 1.

TABLE V

| Test No. | Flocculant I | 1st Stage Agitation | Flocculant II | Dosage (mg/l) | 2nd Stage Agitation |
|---|---|---|---|---|---|
| V | DDA | intense | CMC | 100 | ordinary |
| Va | DDA | intense | PAA 13.3 | 65 | ordinary |
| Vb | DAM/AAm | ordinary | — | — | — |

Figure 4:
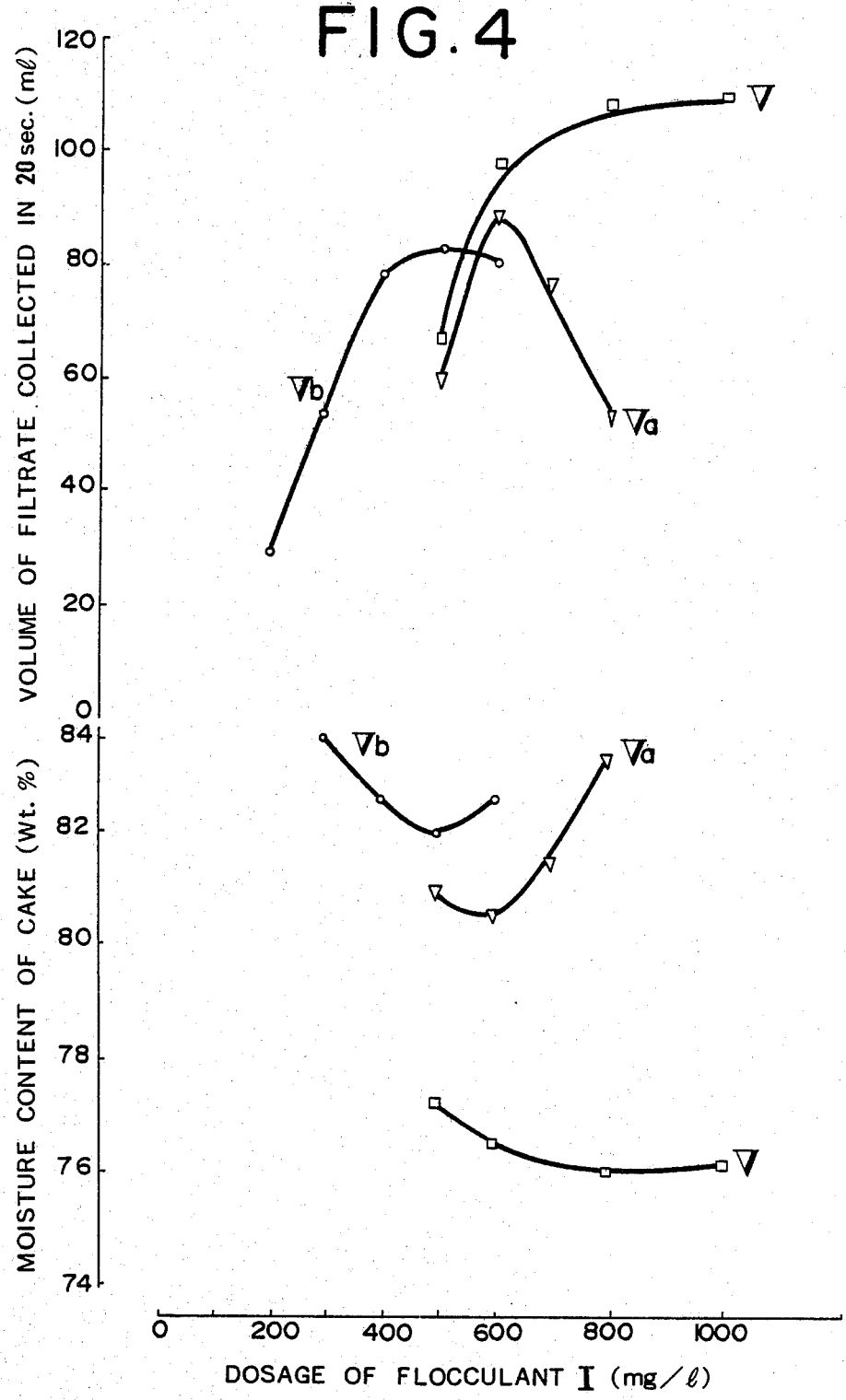

The results obtained are given in FIG. 4 in graphical illustration. As the graph shows, the process according to the present invention provides a treatment which is stable and which exhibits a wide range of allowable dosages of the flocculant I with simultaneous attainment of better filtrability and lower moisture content of the dewatered cake as compared with those obtained according to Va and Vb.

Example 5

An alum coagulation sludge, having a content of SS of 3.49% with VSS proportion of 75.1%, based on the weight of SS, a pH of 6.2 and an electric conductivity of 2,580 $\mu$S/cm, from paper and pulp mill waste water was treated by flocculation under the conditions given in Table VI and the so flocculated sludge was then subjected to the Nutsche test and press test under the same conditions as in Example 1.

TABLE VI

| Test No. | Flocculant I | 1st Stage Agitation | Flocculant II | Dosage (mg/l) | 2nd Stage Agitation |
|---|---|---|---|---|---|
| VI | PAA 15.3 | intense | CTS | 150 | ordinary |
| VIa | PAA 15.3 | intense | DAM 2.7 | 150 | ordinary |
| VIb | PAA 15.3 | ordinary | — | — | — |

Figure 5:
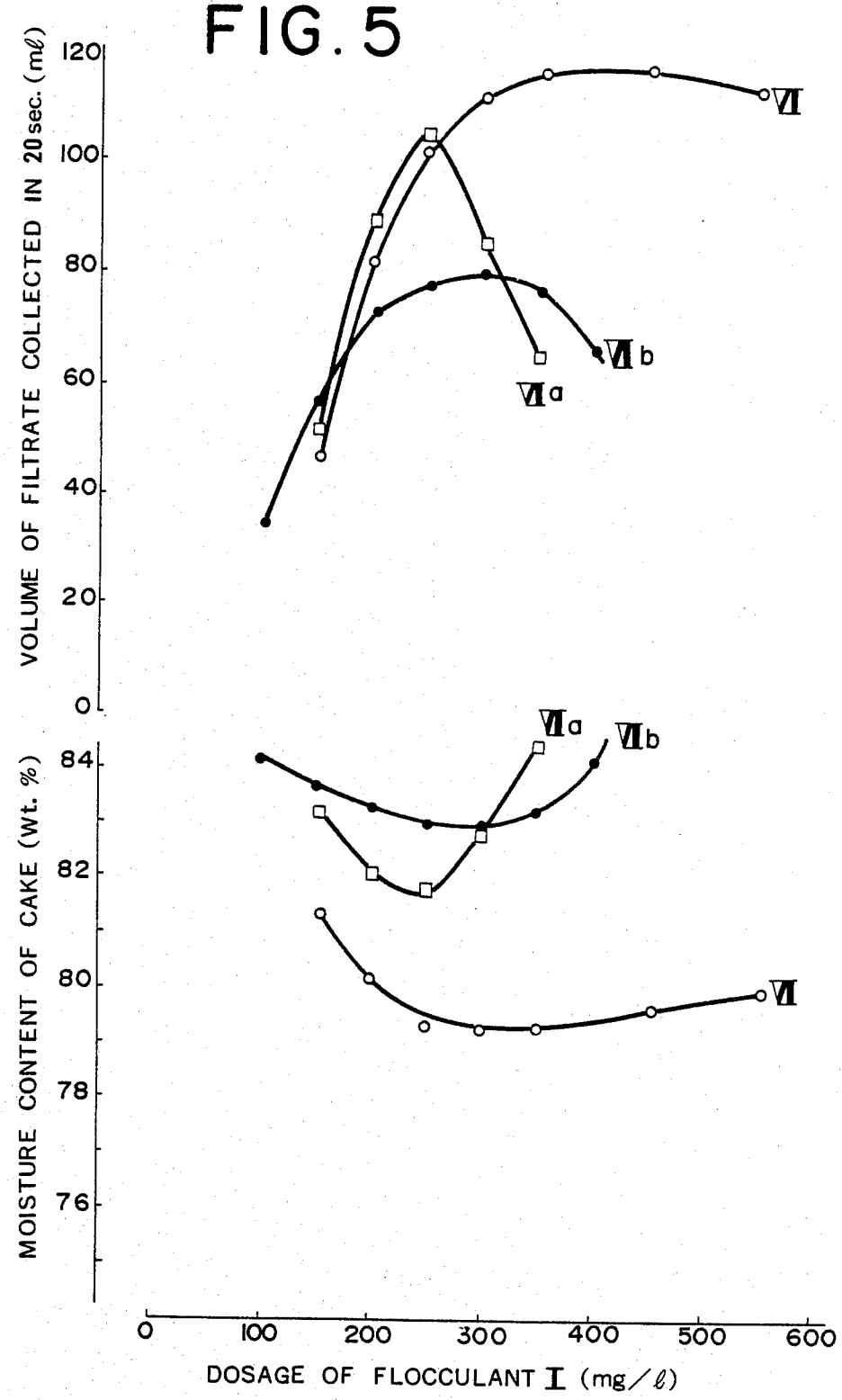

The results obtained are given in FIG. 5 in graphical illustration. The results indicate that similar effects can be achieved when a synthetic high molecular weight compound of anionic nature is employed for the flocculant I and a natural high molecular organic compound of cationic nature is employed for the flocculant II.

Example 6

An excess sludge from an activated sludge treatment of nightsoil having a content of SS of 1.7% with VSS proportion of 70%, a pH of 6.9 and an electric conductivity of 2,550 μS/cm was treated by flocculation under the conditions given in Table VII and the so flocculated sludge was then examined by the Nutsche test and press test. The result of the Nutsche test is also recited in Table VII in the right extreme column. The results of press tests are given in Table VIII.

TABLE VII

| Test No. | Floc-cu-lant I | Dos-age (mg/l) | 1st Stage Agita-tion | Floc-cu-lant II | Dos-age (mg/l) | 2nd Stage Agita-tion | Volume of Filtrate collected in 20 sec. |
|---|---|---|---|---|---|---|---|
| VII | CTS | 480 | intense | PAA 15.3 | 50 | ordinary | 98 |
| VIIa | DAM 5.0 | 200 | intense | PAA 15.3 | 50 | ordinary | 60 |

TABLE VIII

| Pressure (kg/cm²) | Moisture Cont. of Cake (wt. %) | |
|---|---|---|
| | Test No. VII | Test No. VIIa |
| 0.5 | 77.7 | 81.0 |
| 1.0 | 74.0 | 77.8 |
| 1.7 | 70.0 | 74 (poorly exfoliative) |

As the results show, when a natural high molecular organic compound is employed for the flocculant I, a superior dewatering performance can be attained as compared with the case of using a synthetic high molecular weight flocculant therefor.

Example 7

To 200 ml of a mixed sludge composed of a primarily settled sewage sludge and excess sludge from an activated sludge treatment having a content of SS of 2.81% with VSS proportion of 72.0%, a pH of 6.0 and an electric conductivity of 1,940 μS/cm, acetic acid salt of chitosan was added in varying amounts and an intensive agitation was effected. Then, the second stage agitation of ordinary intensity was carried out during addition of sodium polyacrylate as the flocculant II. The so obtained flocculated sludge was then examined by the Nutsche test and press test. The results obtained are recited in Table IX together with the dosage of each flocculant. In Table IX, the results of tests in which a homopolymer of dimethylaminoethyl methacrylate quaternized with methyl chloride was employed in the place of chitosan or in which a partially hydrolyzed polyacrylamide was employed in place of sodium polyacrylate, are also given.

TABLE IX

| Flocculant Used | Dosage mg/l | Volume of Filtrate collected in 20 sec. (ml) | Moisture Content of dewatered Cake (wt. %) |
|---|---|---|---|
| CTS *1 | 150 | 105 | 72.5 |
| NaPA *2 | 75 | | |
| CTS | 200 | 140 | 71.4 |
| NaPA | 75 | | |
| CTS | 300 | 153 | 69.7 |
| NaPA | 75 | | |
| DAM *3 | 150 | 84 | 76.0 |
| NaPA | 75 | | |
| DAM | 200 | 94 | 75.0 |
| NaPA | 75 | | |
| DAM | 300 | 117 | 73.6 |
| NaPA | 75 | | |
| CTS | 150 | 88 | 74.1 |
| PAAm *4 | 75 | | |
| CTS | 200 | 105 | 73.2 |
| PAAm | 75 | | |
| CTS | 300 | 127 | 72.6 |
| PAAm | 75 | | |

*1 Acetic acid salt, with colloid equivalent of 4.2 meq/g; viscosity of 0.5% aqueous solution at 30° C. = 80 cP (with B-type viscometer at 30 rpm).
*2 Sodium salt of polyacrylic acid, with $[\eta]_{2N-NaOH}^{30°C} = 6.6$ [dl/g]
*3 Homopolymer of dimethylaminoethyl methacrylate quaternized with methyl chloride of 4.81 meq/g; $[\eta]_{1N-NaCl}^{30°C} = 5.0$ [dl/g]
*4 Partially hydrolyzed polyacrylamide, with colloid equivalent of −3.82 meq/g; $[\eta]_{1N-NaCl}^{30°C} = 15.3$ [dl/g]

Example 8

The procedures of Example 7 were followed with the exception that the dosages of anionic and cationic high molecular weight flocculants were changed to 75 mg/l and 200 mg/l respectively, to carry out press tests under various squeezing pressures.

The relationship between the squeezing pressure and the moisture content of the dewatered cake for the cases where the weight proportion of (1) the amount of wet cake cleared off spontaneously from the filter cloth upon peeling the wet cake off the filter cloth to (2) the total amount of the wet cake, (exfoliation index), were not reduced below 95% was as given in Table X. In Table X, Condition A corresponds to the case where the treatment was carried out using a combination of chitosan with NaPA employed in Example 7, Condition B to the case where the treatment was conducted using a combination of chitosan with PAAm as employed in Example 7 and Condition C to the case where the treatment was performed by the sole addition of DAM in an amount of 300 mg/l with agitation as employed for ordinary flocculation. In Conditions B and C in Table X, the values for higher pressures are lacking since the squeezing dewatering became impossible due to the lack of strength of the dewatered cake and to the inferior exfoliativeness.

TABLE X

| | Moisture Content in Wt. % of Dewatered cake for Squeezing Pressure at: | | | |
|---|---|---|---|---|
| Condition | 0.5 kg/cm² | 1.0 kg/cm² | 3.0 kg/cm² | 5.0 kg/cm² |
| A | 71.4 | 69.0 | 64.8 | 63.0 |
| B | 73.2 | 71.3 | 67.5 | — |
| C | 76.5 | — | — | — |

Example 9

To a liquor in the aeration tank in an activated sludge treatment of waste water from a chemical factory having a content of SS of 4,600 mg/l with VSS proportion of 67%, a pH of 6.2 and an electric conductivity of 5,650 μS/cm, acetic acid salt of chitosan (as employed in Example 7) was added with intense agitation, and sodium polyacrylate was then added thereto with ordinary agitation to effect flocculation. For comparison, a flocculation treatment using a combination of flocculants consisting of DAM and NaPA was carried out in addition to the blank experiment. The volume of the sedimented sludge layer was measured after 5 minutes and after 30 minutes from the end of the second stage agitation. The results are summarized in Table XI in relation to the conditions of the flocculation treatments.

TABLE XI

| Flocculant used | Dosage (mg/l) | Sludge Volume in Sedimentation (Vol. % to initial Volume) | |
|---|---|---|---|
| | | after 5 min. | after 30 min. |
| CTS | 0.20 | 84 | 40 |
| NaPA | 0.10 | | |
| CTS | 0.20 | 87 | 51 |
| PAAm | 0.10 | | |
| DAM | 0.20 | 89 | 56 |
| NaPA | 0.10 | | |
| Blank | — | 91 | 66 |

EXAMPLE 10

An alum coagulation sludge having a content of SS of 3.59% with VSS proportion of 75.0%, a pH of 6.4 and an electric conductivity of 2,680 μS/cm from a paper and pulp mill waste water was used. In order to carry out the flocculation treatments, flocculant combinations of sodium polyacrylate/chitosan and partially hydrolyzed polyacrylamide/chitosan, for the process according to the present invention, and sodium polyacrylate/DAM, for comparison, and a sole flocculant of sodium polyacrylate, also for comparison, were employed. The flocculants employed were the same as in Example 7. The first stage agitation was carried out with high intensity and the second stage agitation with ordinary intensity. In the sole addition of NaPA, the agitation was conducted in an ordinary mild degree. The results of the Nutsche tests and press tests performed as in Example 7 are summarized in relation to the conditions of flocculation treatment in Table XII.

TABLE XII

| Flocculant Used | Dosage (mg/l) | Volume of Filtrate Collected in 20 sec. (ml) | Moisture Content of Dewatered Cake (wt. %) |
|---|---|---|---|
| NaPA | 200 | 106 | 77.8 |
| CTS | 150 | | |
| NaPA | 250 | 124 | 76.7 |
| CTS | 150 | | |
| NaPA | 300 | 133 | 76.1 |
| CTS | 150 | | |
| PAAm | 200 | 84 | 80.2 |
| CTS | 150 | | |
| PAAm | 250 | 104 | 79.3 |
| CTS | 150 | | |
| PAAm | 300 | 115 | 79.2 |
| CTS | 150 | | |
| NaPA | 200 | 71 | 81.8 |
| DAM | 150 | | |
| NaPA | 250 | 83 | 81.1 |
| DAM | 150 | | |
| NaPA | 300 | 90 | 80.7 |
| DAM | 150 | | |
| NaPA | 300 | 85 | 83.2 |

Example 11

200 ml of a mixed sludge composed of a primarily settled sewage sludge and of an excess sludge (pH 5.8, SS: 2.70%, $SO_4^{--}$: 23 mg/l, elec. cond.: 1,980 μs/cm) were sampled. The sample was then dosed first with an inorganic sulfate and then, after agitation, with an alkaline earth metal compound, and finally, also after agitation, with the acetic acid salt of chitosan used in Example 7, as the flocculant I, and the mixture was agitated at a high intensity by a hand mixer having two beaters for 30 seconds at 500 rpm (corresponding to a circumferential velocity of 1 m/sec.). Subsequently, sodium polyacrylate as employed in Example 7 was added to the mixture as the flocculant II and the second stage agitation at ordinary intensity was carried out using a hand mixer having only one beater at 250 rpm (corresponding to a circumferential velocity of 0.5 m/sec) for 15 seconds to effect flocculation. The so-obtained flocculated sludge was examined for floc size filtrability by pouring the sludge into a Büchner funnel covered with a 100-mesh nylon filter cloth to determine the volume of filtrate during certain time intervals. The results are summarized in Table XIII together with the testing conditions. For comparison, test results for the cases in which an alkaline earth metal compound was not added and both alkaline earth metal compound as well as inorganic sulfate were not added are also given therein.

TABLE XIII

| Amount of Sulfate added (N) | Amount of Alkaline Earth Compound added (N) | Dosage of Flocculant I (mg/l) | Dosage of Flocculant II (mg/l) | Floc Diameter (mm) | Volume of Filtrate collected (ml) At specified Time Intervals | | | | |
|---|---|---|---|---|---|---|---|---|---|
| | | | | | 10 sec. | 20 sec. | 30 sec. | 45 sec. | 60 sec. |
| — | — | 250 | 75 | 2.0–3.0 | 97 | 117 | 133 | 146 | 157 |
| (NaCl 0.1) | — | 250 | 75 | 2.0–3.0 | 96 | 115 | 130 | 144 | 156 |
| Na₂SO₄ 0.05 | — | 250 | 75 | 0.7–1.0 | 62 | 81 | 96 | 113 | 125 |
| 0.1 | | | | 0.3–0.5 | 15 | 20 | 23 | 27 | 31 |
| MgSO₄ 0.05 | — | 250 | 75 | 0.5–0.7 | 33 | 43 | 47 | 53 | 58 |

TABLE XIII-continued

| Amount of Sulfate added (N) | | Amount of Alkaline Earth Compound added (N) | | Dosage of Flocculant I (mg/l) | Dosage of Flocculant II (mg/l) | Floc Diameter (mm) | Volume of Filtrate collected (ml) At specified Time Intervals | | | | |
|---|---|---|---|---|---|---|---|---|---|---|---|
| | | | | | | | 10 sec. | 20 sec. | 30 sec. | 45 sec. | 60 sec. |
| ZnSO$_4$ | 0.05 | — | | 250 | 75 | 0.3–0.5 | 13 | 17 | 21 | 27 | 29 |
| | | | 0.01 | | 75 | 1.5–2.0 | 85 | 103 | 118 | 134 | 148 |
| Na$_2$SO$_4$ | 0.05 | CaCl$_2$ | 0.02 | 250 | 75 | 1.5–2.0 | 93 | 115 | 129 | 146 | 155 |
| | | | 0.05 | | 150 | 1.0–1.5 | 98 | 118 | 134 | 149 | 160 |
| | | | 0.01 | | | 1.5–2.0 | 90 | 116 | 134 | 150 | 160 |
| Na$_2$SO$_4$ | 0.05 | MgCl$_2$ | 0.02 | 250 | 75 | 1.5–2.0 | 83 | 104 | 120 | 133 | 142 |
| | | | 0.05 | | | 1.0–1.5 | 62 | 72 | 81 | 90 | 97 |
| | | | 0.01 | | | 0.7–1.0 | 57 | 72 | 80 | 94 | 105 |
| Na$_2$SO$_4$ | 0.05 | BaCl$_2$ | 0.02 | 250 | 75 | 1.0–1.5 | 72 | 88 | 101 | 113 | 127 |
| | | | 0.05 | | | 2.0–3.0 | 98 | 108 | 129 | 143 | 157 |

Example 12

200 ml of a mixed sludge (pH 7.4, SS: 1.38% with VSS proportion of 67.6%, elec. cond.: 2,830 μS/cm, SO$_4^{--}$: 181 mg/l) consisting of primary, secondary and tertiary (coagulation with aluminum sulfate) sludges from an oxidative treatment of nightsoil were sampled. This sample was then dosed first with calcium chloride (CaCl$_2$·2H$_2$O) and stirred, and then, with the acetic acid salt of chitosan used in Example 7, agitated at high intensity as employed in Example 11. The NaPA used in Example 7 was added thereto and agitation of ordinary intensity was used to effect flocculation of the sludge. The flocculated sludge was examined by the Nutsche test and press test, the results of which are recited in Table XIV together with the testing conditions.

TABLE XIV

| Dosage of CaCl$_2$· 2H$_2$O (mg/l) | Dosage of Flocculant I (mg/l) | Dosage of Flocculant II (mg/l) | Volume of Filtrate collected in 20 sec. (ml) | Moisture Content of Dewatered Cake (Wt. %) |
|---|---|---|---|---|
| 0 | 200 | 0 | 20 | 81.7 |
| 0 | 200 | 75 | 47 | 77.6 |
| 400 | 200 | 75 | 112 | 76.1 |
| 600 | 200 | 75 | 132 | 75.3 |
| 800 | 200 | 75 | 130 | 75.2 |

Example 13

200 ml samples of a mixed sludge (pH 5.8, SS: 2.24% with VSS proportion of 76.3%) composed of the primarily settled sludge and excess sludge from an activated sludge treatment of sewage water were taken. These samples were treated using various combinations of flocculant I and flocculant II as given in Table XV in such a manner that the sample was dosed by the flocculant I in an amount indicated in Table XV and was subjected to a first stage agitation using a hand mixer having one beater or two beaters in an agitation intensity varying within the range from 200 to 500 rpm (corresponding to circumferential velocity range from 0.4 to 1 m/sec) for a period of 20–60 seconds. The average size of the flocs thus formed was determined by microscope photograph.

Second stage agitation was then conducted after the addition of the flocculant II in an amount indicated in Table XV under agitation of ordinary intensity, by employing a hand-mixer having one beater at 250 rpm (corresponding to a circumferential velocity of 0.5 m/sec.) for 20 seconds. The flocculated sludge was poured into a Büchner funnel covered with a 100-mesh nylon filter cloth to conduct a Nutsche test by measuring the volume of filtrate collected in 20 seconds. 15 g of filtered sludge cake were then sampled. This sample was placed between a filter cloth (made of polyester, woven in herringbone pattern) employed in a belt press type dehydrator and a layer of sponge and was squeezed under a pressure of 1.0 kg/cm$^2$ for 2 minutes, whereupon the exfoliation index, expressed by the weight proportion of the amount of wet cake cleared off from the filter cloth upon peeling the wet cake off the filter cloth to the total amount of wet cake, and the moisture content of the dewatered sludge cake were observed. The results obtained are given in FIGS. 6 to 8 in graphic illustrations showing the correlation between the average diameter of floc after the first agitation, yield of filtrate, exfoliation index and moisture content. In the graphs, arrows appended to each curve represent the each corresponding ordinate and abscissa and the symbols for each plot correspond to the identifications given in Table XV. The dosage of each flocculant was selected to be at the optimum amount.

TABLE XV

Figure 6:
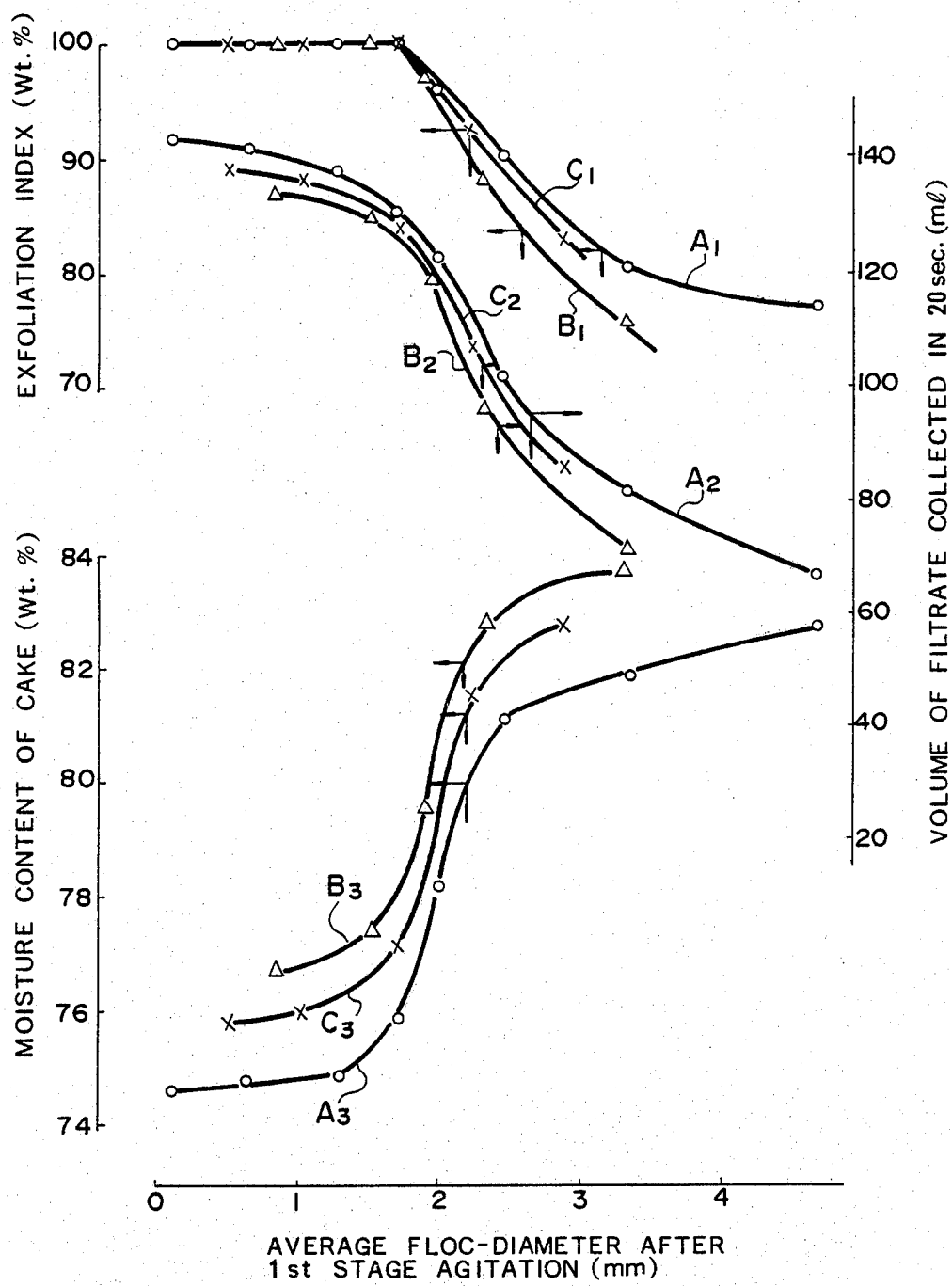
Figure 7:
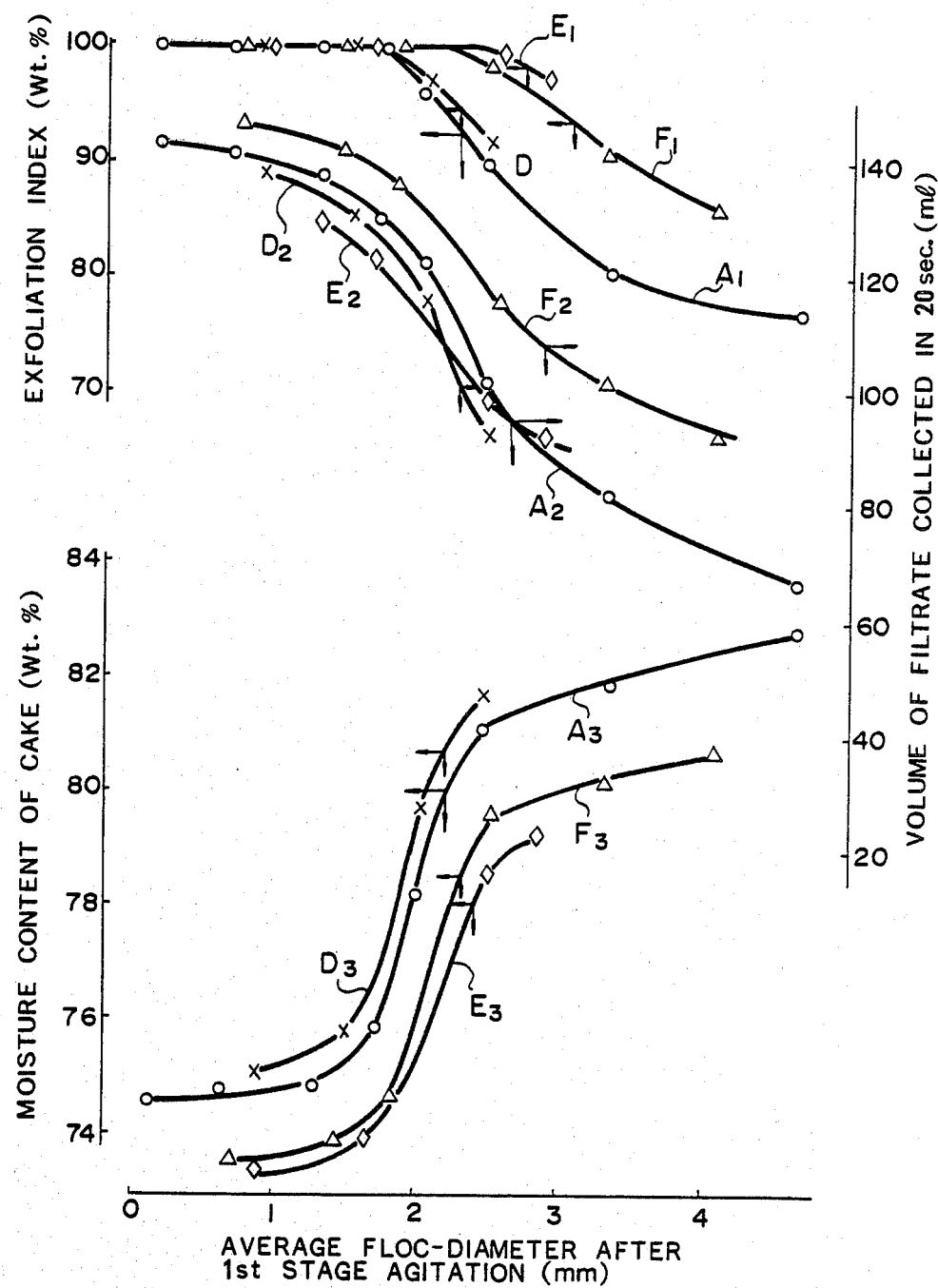
Figure 8:
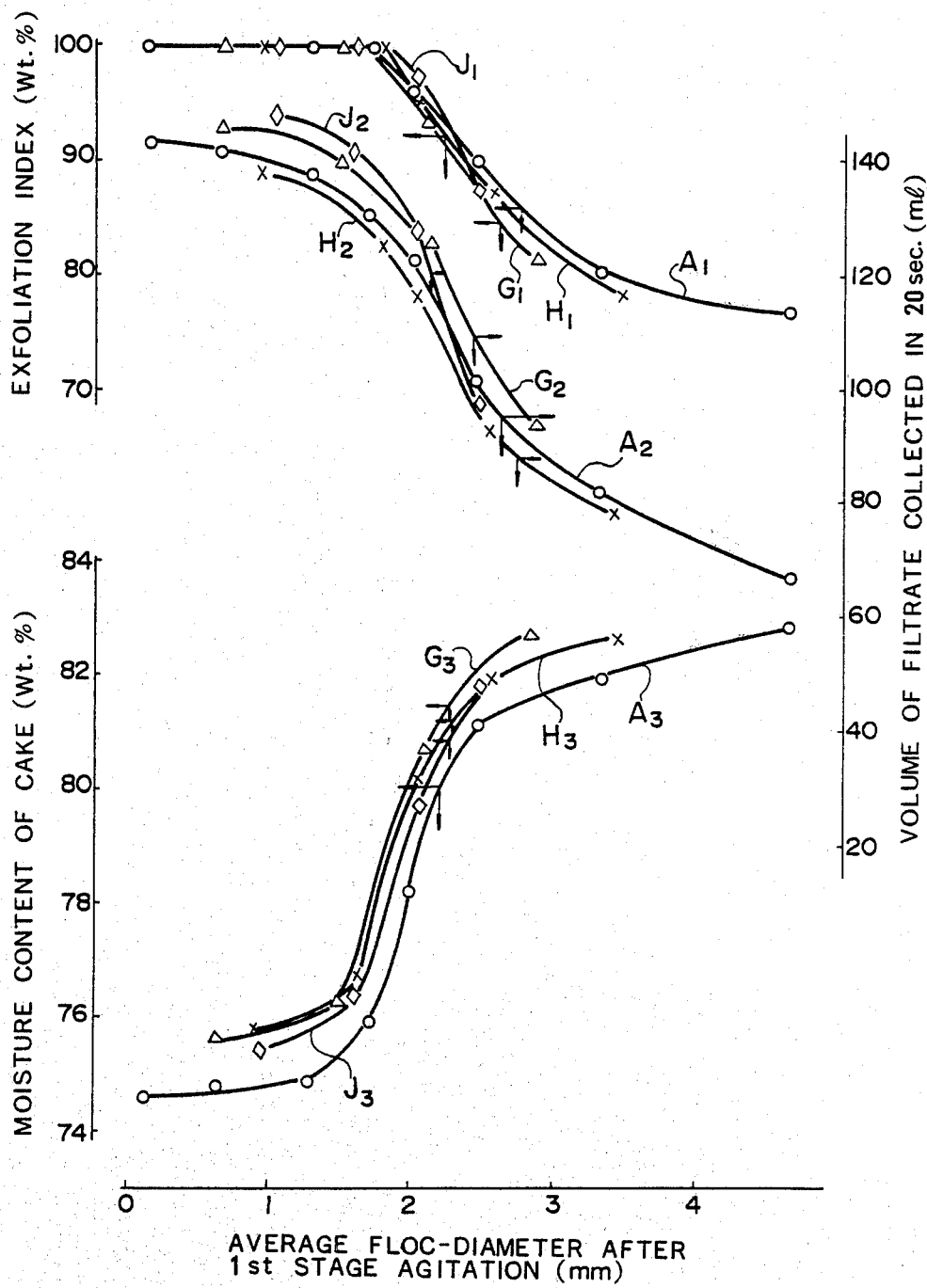

Explanation of Curves in FIGS. 6 to 8

| Dosage of Flocculant in % with resp. to SS | | | | Curves for Measurement for | | | Symbol of Plots |
|---|---|---|---|---|---|---|---|
| Flocculant I* | | Flocculant II* | | Exfoliativeness | Volume of Filtrate | Moisture content | |
| CI | 1.00% | AI | 0.50% | A$_1$ | A$_2$ | A$_3$ | ○ |
| CII | 1.00% | AI | 0.50% | B$_1$ | B$_2$ | B$_3$ | △ |
| CIII | 1.00% | AI | 0.50% | C$_1$ | C$_2$ | C$_3$ | X |
| CIV | 2.00% | AI | 0.50% | D$_1$ | D$_2$ | D$_3$ | X |
| CV | 2.00% | AV | 0.70% | E$_1$ | E$_2$ | E$_3$ | ◇ |
| CVI | 1.00% | AI | 0.50% | F$_1$ | F$_2$ | F$_3$ | △ |
| CI | 1.00% | AII | 0.50% | G$_1$ | G$_2$ | G$_3$ | △ |
| CI | 1.00% | AIII | 0.50% | H$_1$ | H$_2$ | H$_3$ | X |
| CI | 1.00% | AIV | 0.50% | J$_1$ | J$_2$ | J$_3$ | ◇ |

*See Table XVI

TABLE XVI

Particulars of the Flocculant Used

| Denotation | Compound | Viscosity | Colloid Eq. Value (meq/g) |
|---|---|---|---|
| CI | Homopolymer of dimethylaminoethyl methacrylate quaternized with methyl chloride | $[\eta]\,^{30°\,C.}_{1N-NaNO_3} = 5.2$ | 4.8 |

TABLE XVI-continued

Particulars of the Flocculant Used

| Denotation | Compound | Viscosity | Colloid Eq. Value (meq/g) |
|---|---|---|---|
| CII | Copolymer of dimethylaminoethyl methacrylate quaternized with methyl chloride and acrylamide | $[\eta]^{30°C}_{1N-NaNO_3} = 7.1$ | 2.7 |
| CIII | Mannich-reactioned polyacrylamide | $[\eta]^{30°C}_{1N-NaNO_3} = 6.3$ | 3.4 |
| CIV | Homopolymer of dimethyldiallylammonium chloride | $[\eta]^{30°C}_{1N-NaNO_3} = 1.4$ | 5.8 |
| CV | Polyethyleneimine | (M.W. = 100,000) | 18.1 |
| CVI | Acetic acid salt of chitosan | 80 cP (0.5% aq. soln.) at 30 rpm with B-type viscometer | 4.2 |
| AI | Sodium salt of polyacrylic acid | $[\eta]^{30°C}_{2N-NaOH} = 6.8$ | −10.6 |
| AII | Partially hydrolyzed polyacrylamide | $[\eta]^{30°C}_{1N-NaNO_3} = 18.4$ | −4.3 |
| AIII | Copolymer of sodium vinylsulfonate with acrylamide | $[\eta]^{30°C}_{1N-NaNO_3} = 10.2$ | −2.4 |
| AIV | Terpolymer of sodium 2-acrylamido-2-methyl-propanesulfonate, sodium acrylate and acrylamide (molar charge ratio: 2/30/68) | $[\eta]^{30°C}_{1N-NaNO_3} = 16.7$ | −3.9 |
| AV | Sodium carboxymethyl cellulose | $[\eta]^{30°C}_{0.1N-NaCl} = 12.3$ | −3.2 |

The results indicate that the dewatering performance became, for all of the combinations of flocculants, very preferable when high intensity agitation powerful enough to bring about an average floc size of 2 mm or smaller (including the case of no flocculation) after the first stage agitation was used. The results also suggest that the dewatering effect is superior when at least one of the flocculants I and II consists of a natural high molecular weight compound or a derivative of such compound.

Example 14

200 ml samples of excess sludge (pH 6.8, SS: 1.86% with VSS proportion of 83.4%) from an oxidative treatment of nightsoil were taken. The samples were tested by the addition of various combinations of flocculants as indicated in Table XVII, by the procedures as in Example 13. The results are given in FIGS. 9 and 10 in graphic illustration.

TABLE XVII

Figure 9:
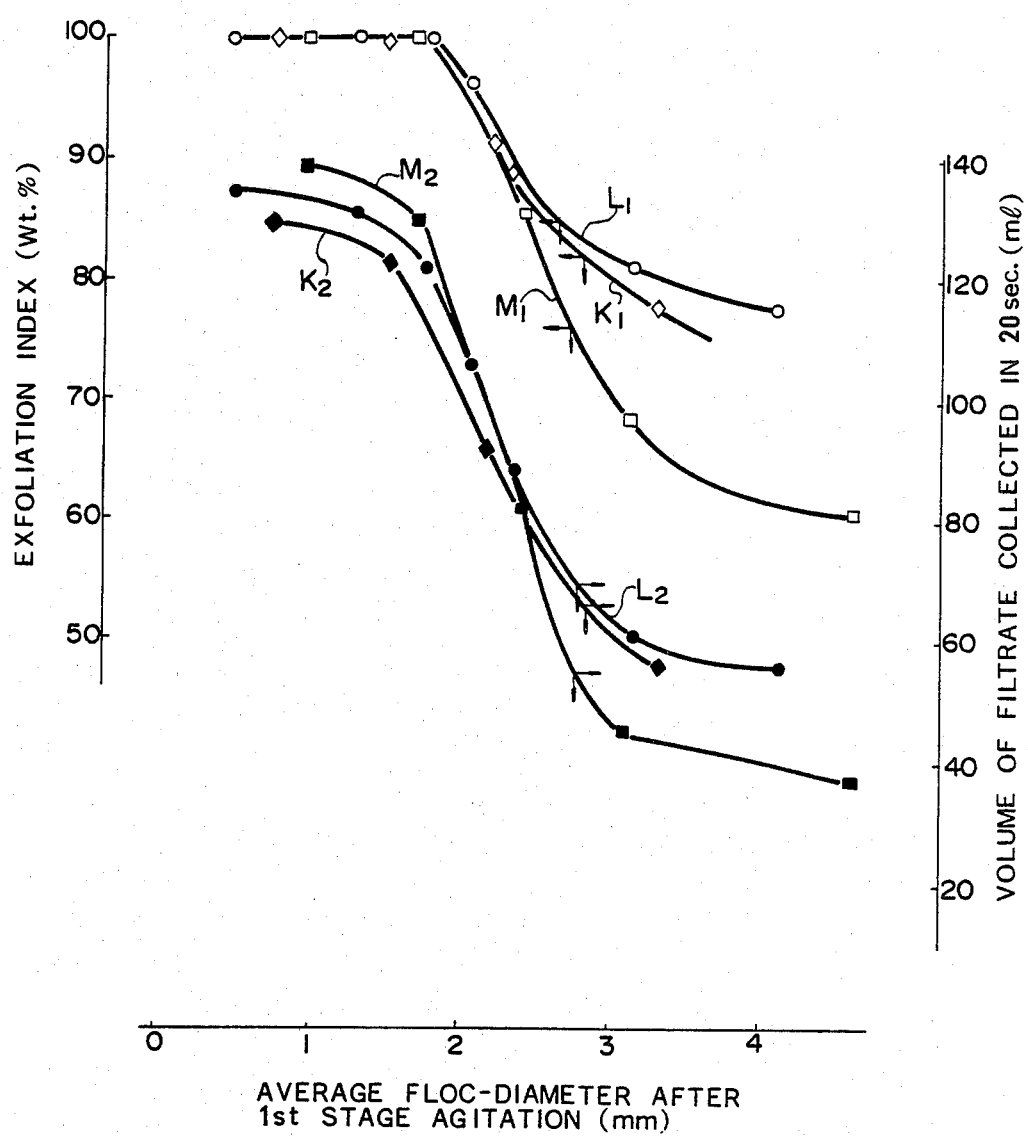
Figure 10:
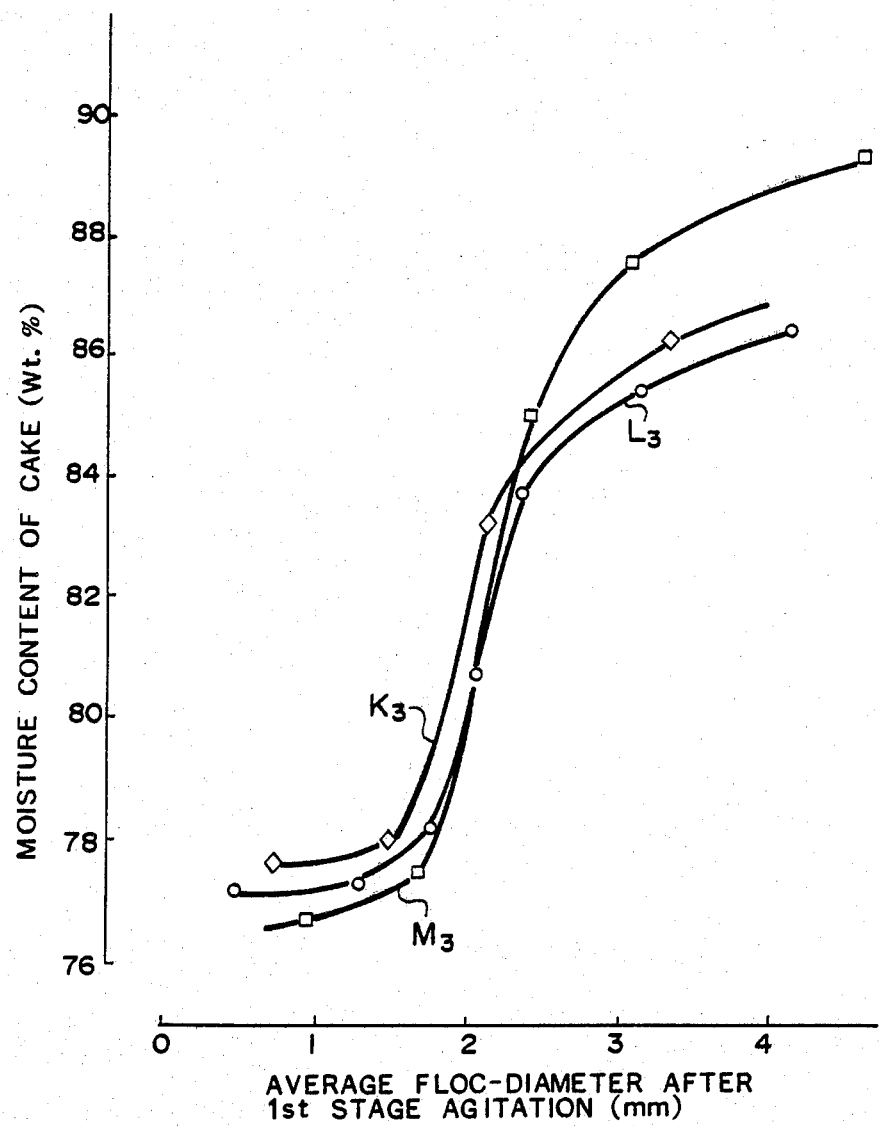

Explanation of Curves in FIGS. 9 and 10

| Dosage of Flocculant in % with resp. to SS | | Curves for Measurement for | | | Symbol of Plots |
|---|---|---|---|---|---|
| Flocculant I | Flocculant II | Exfol. Index | Volume of Filtrate | Moisture Content | |
| CVI* 0.50% | AI* 0.25% | $K_1$ | $K_2$ | $K_3$ | ◇ |
| CVI 1.00% | AI 0.50% | $L_1$ | $L_2$ | $L_3$ | ○ |
| CVI 3.00% | AI 1.50% | $M_1$ | $M_2$ | $M_3$ | □ |

*See Table XVI

The results indicate that the dewatering performance is excellent when an intensive agitation is used such that the average floc size after the first stage agitation does not exceed 2 mm, as shown by Example 13. It is also seen that wide permissible ranges of dosages of flocculants can be used.

Example 15

200 ml samples of an alum coagulation sludge (pH 5.2, SS: 2.7% with VSS proportion of 63.1%) of integrated waste water from a paper and pulp mill were taken. Test procedures were as described in Example 13, while various combinations of flocculants indicated in Table XVIII were employed. The results obtained are given in FIG. 11 in graphic illustration.

TABLE XVIII

Figure 11:
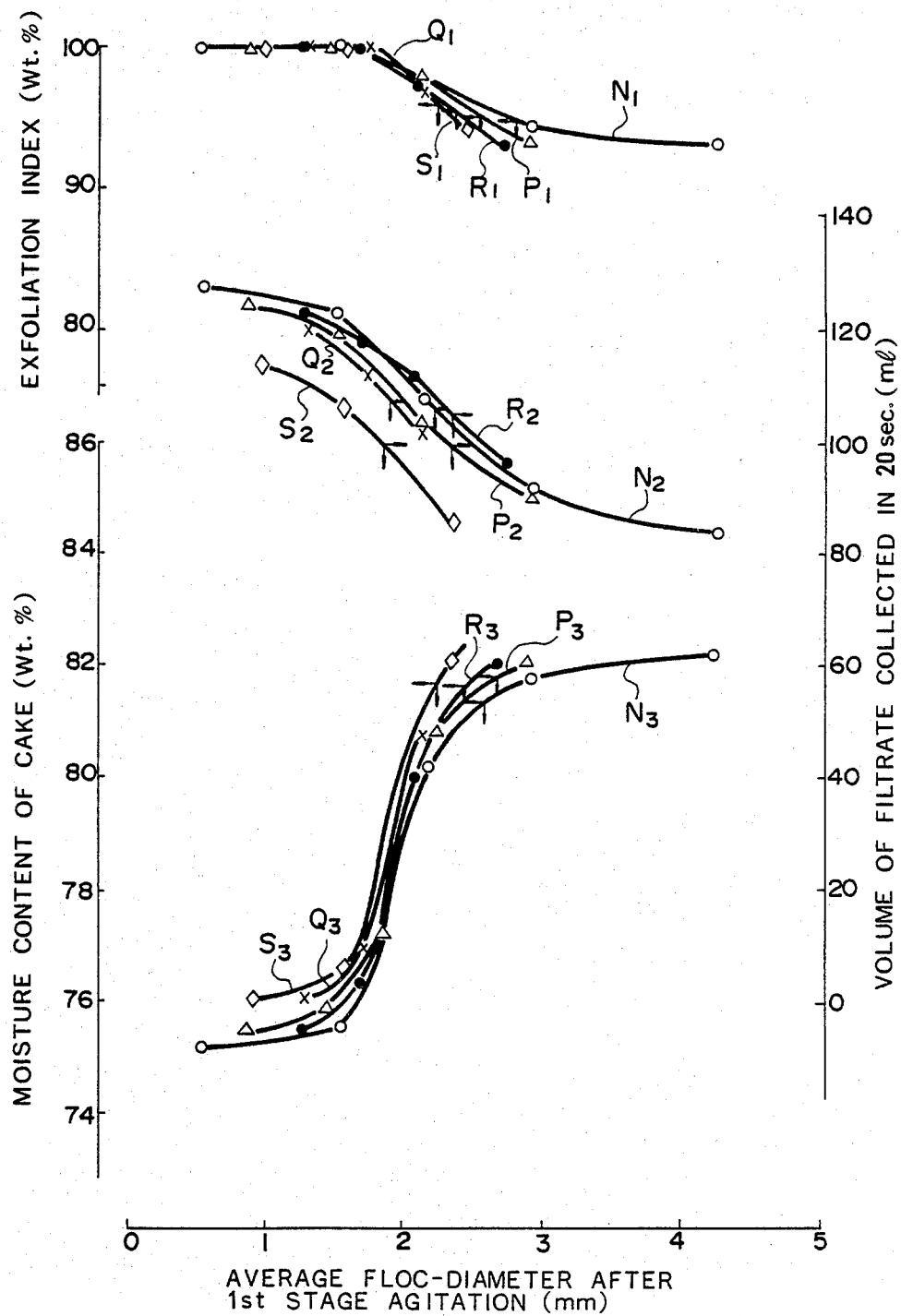

Explanation of Curves in FIG. 11

| Dosage of Flocculant in % with resp. to SS | | Curves for Measurement for | | | Symbol of Plots |
|---|---|---|---|---|---|
| Flocculant I* | Flocculant II* | Exfol. Index | Volume of Filtrate | Moisture content | |
| AI 0.7% | CI 0.5% | $N_1$ | $N_2$ | $N_3$ | ○ |
| AII 0.7% | CI 0.5% | $P_1$ | $P_2$ | $P_3$ | △ |
| AIII 0.7% | CIII 0.5% | $Q_1$ | $Q_2$ | $Q_3$ | × |
| AIV 0.7% | CVI 0.5% | $R_1$ | $R_2$ | $R_3$ | ● |
| AV 1.2% | CII 0.5% | $S_1$ | $S_2$ | $S_3$ | ◇ |

*See Table XVI

From these results it is seen that excellent dewatering performance can be achieved when, as in Example 13, intense agitation that renders an average floc diameter after the first stage agitation of not higher than 2 mm is adopted for the first stage agitation, even in the case of adding an anionic flocculant as the flocculant I.

Example 16

To the sludge used in Example 14, the flocculant CVI denoted in Table XVI was added as the flocculant I in an amount of 1.0% by weight, based on the SS content of the sludge. The first stage agitation was carried out in a reaction vessel with a detention time of 2 minutes by agitating the sludge at varying intensities. By varying the rate of revolution of the stirrer within the range from 25 to 250 rpm (corresponding to the range of circumferential velocity from 0.5 to 5 m/sec.), changes in agitation intensity were achieved.

Figure 12:
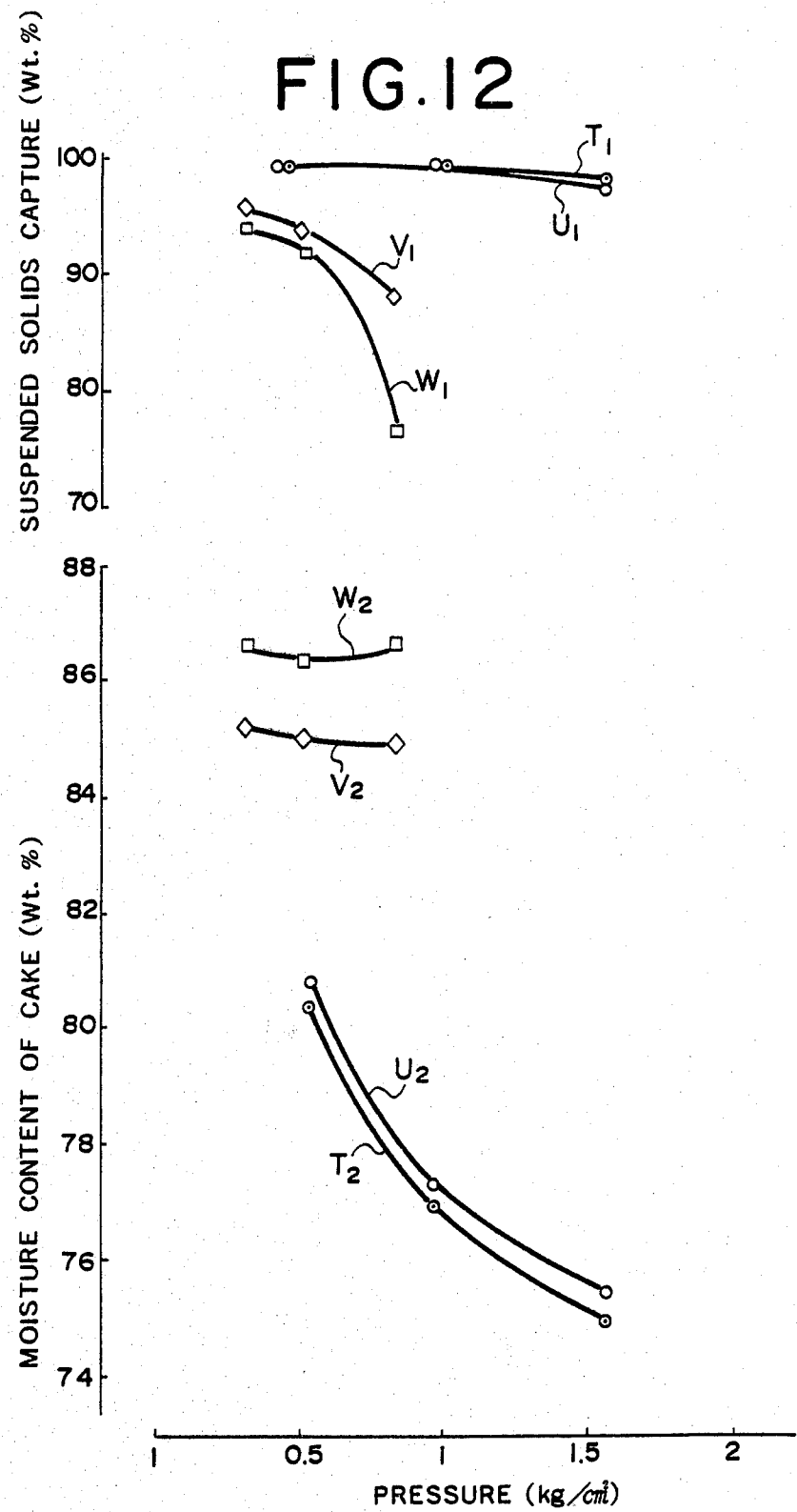

Thereafter, the flocculant AI denoted in Table XVI was added as the flocculant II in an amount of 0.50% by weight, based on the SS content. The second agitation was carried out in a reaction vessel with detention time of 2 minutes at an ordinary agitation intensity of 25 rpm (corresponding to a circumferential velocity of 0.5 m/sec) of the stirrer. The flocculated sludge was supplied to a squeezing filtration dehydrator HYDO-PRESS PA 1250 (trade mark of Kurita Water Industries Ltd.) of the belt press type having filter cloths to effect dewatering. The filter cloth was made of polyester woven in a herringbone pattern, exhibiting an air permeation rate of 16,000 ml/min/cm$^2$ and having a width of 125 cm. The dewatering was carried out at a filter cloth travelling velocity of 0.4 m/min and at a sludge dewatering rate of 60 kg of dry solids per meter of filter cloth width per hour under various squeezing pressures varied for each agitation intensity of the first stage agitation. The capture yield results of SS (suspended solids capture) and moisture content of the dewatered cake observed are shown in FIG. 12 in graphic illustration. Similar experiments were conducted by varying the sludge dewatering rate under pressure fixed at 0.5 kg/cm$^2$, of which results are given in FIG. 13 as a graph. The average floc diameters after the first stage agitation observed in these experiments of FIGS. 12 and 13 are recited in Table XIX in relation to the corresponding curves.

TABLE XIX

Figure 13:
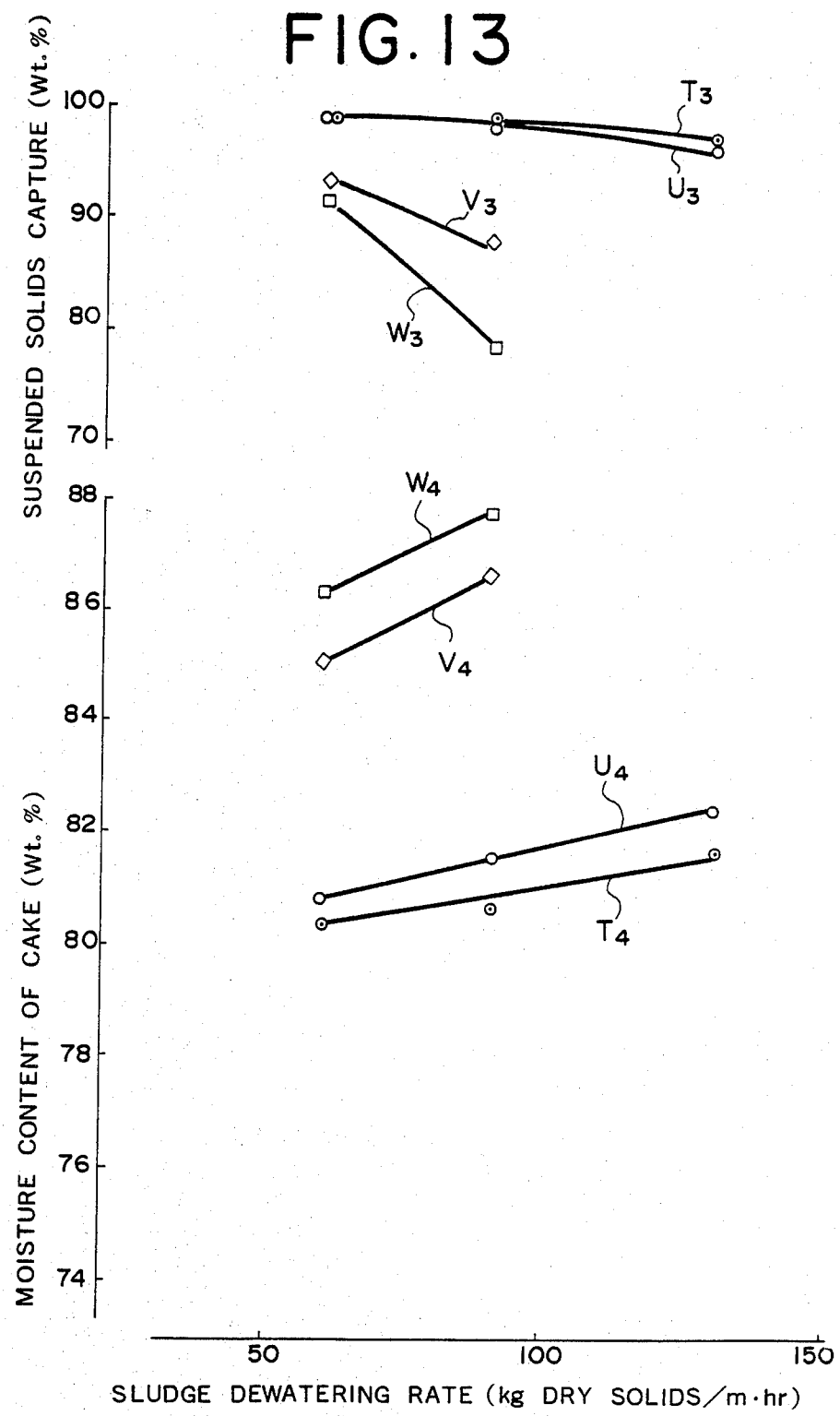

| Explanation of Curves in FIGS. 12 and 13 | | Average Floc-Diam. after 1st Stage Agitation (mm) | | | |
|---|---|---|---|---|---|
| | | 0.7 | 1.8 | 2.2 | 3.1 |
| FIG. 12 | Suspended Solids Capture | $T_1$ | $U_1$ | $V_1$ | $W_1$ |
| | Moisture Content of Cake | $T_2$ | $U_2$ | $V_2$ | $W_2$ |
| FIG. 13 | Suspended Solids Capture | $T_3$ | $U_3$ | $V_3$ | $W_3$ |
| | Moisture content of Cake | $T_4$ | $U_4$ | $V_4$ | $W_4$ |
| | Symbol of Plots | ● | ○ | ◇ | □ |

In FIGS. 12 and 13, all the curves $V_1$ to $V_4$ as well as $W_1$ to $W_4$ indicate that the suspended solids capture decreases at the right side region of the graph, which suggests that neither the squeezing pressure nor the sludge dewatering rate had been able to achieve a further increase. As can be seen, the dewatering performance will be superior when there is employed for the first stage agitation, a powerful agitation capable of achieving an average floc size after the first stage agitation of not greater than 2 mm.

Example 17

A mixture of excess sludge from an activated sludge treatment of nightsoil and a tertiary treatment (coagulation with aluminum sulfate) sludge, having a pH of 6.3 and SS content of 2.03% with VSS proportion of 72.3%, was supplied to a first agitation tank (detention time: 2 minutes) equipped with an agitating impeller.

Upon the addition of a first flocculant selected from those given in Table XX, an intense first stage agitation was effected at a rate of revolution of the impeller of 125 rpm (corresponding to a circumferential velocity of 2.5 m/sec). Subsequently the mixture was conducted into a second agitation tank (detention time: 2 minutes) also equipped with an agitating impeller, in which the mixture was dosed with a second flocculant selected from those given in Table XX and was subjected to a second stage agitation of usual mild intensity realized by operating the impeller at a rate of revolution of 25 rpm (corresponding) to a circumferential velocity of 0.5 m/sec). The flocculated mixture was then transported into the belt press type dehydrator used in Example 16 to subject the mixture to dewatering. The travelling velocity of the filter cloth was adjusted at 0.93 m/min and the sludge dewatering rate was set at 100 kg of dried sludge per meter of filter cloth width per hour.

Figure 14:
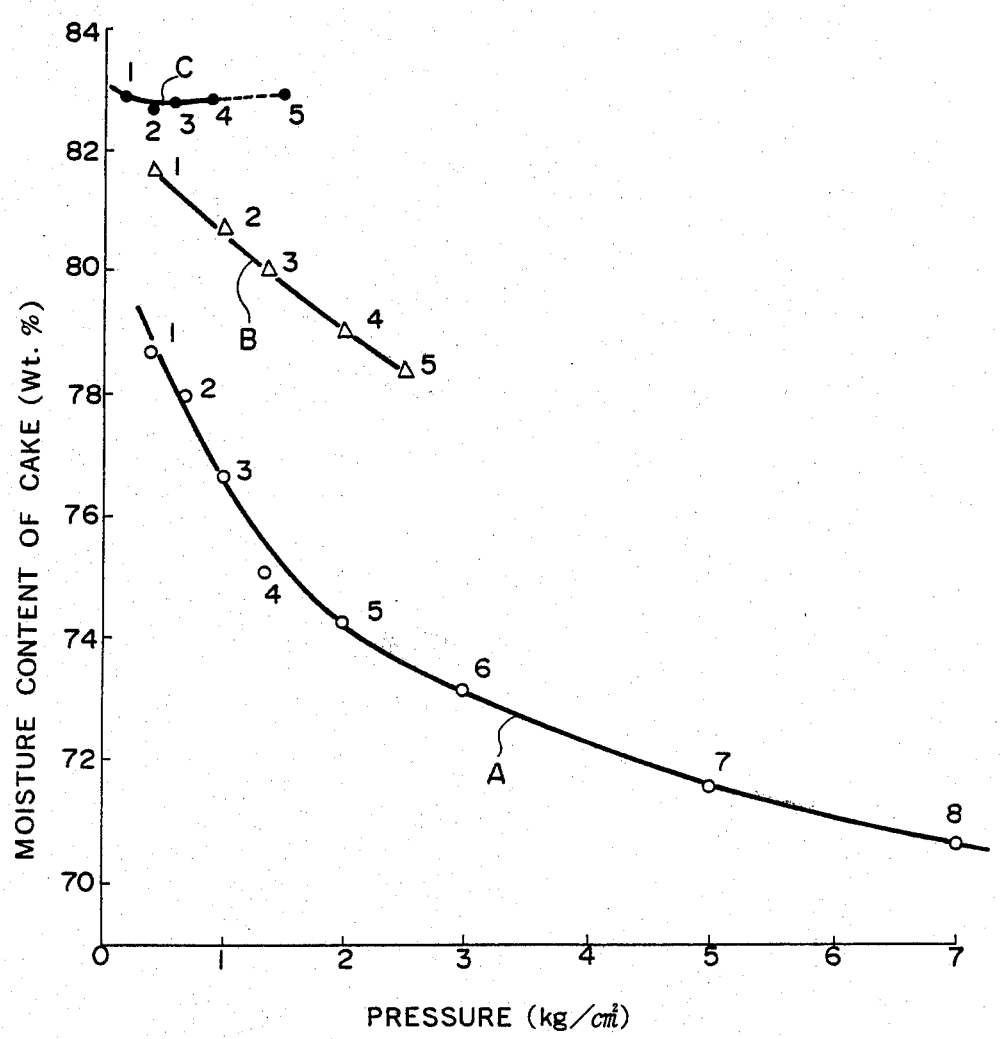

The experiments were conducted for three cases, in which (A) 2.2% by weight, with respect to the content of SS in the mixture, of the flocculant (I) of Table XX was employed for the first flocculant and 0.7% by weight, with respect to the content of SS, of the flocculant (VI) was employed for the second flocculant; (B) 2.2% by weight, with respect to the SS content, of the flocculant (III) of Table XX was used for the first flocculant and 0.7% by weight, based on the SS content, of the flocculant (VII) was used for the second flocculant; and as a comparison test, (C) 2.0% by weight, based on SS content, of the flocculant (II) of Table XX alone was added to the second agitation tank. The experimental results of the variation of moisture content in the dewatered cake against the variation of the squeezing pressure in the dewatering test are shown in FIG. 14 in a graphical illustration. The results of determinations of suspended solids capture for the mixtures corresponding to the each plot point in FIG. 14 are recited in Table XXI.

The dosage of the flocculant in the case (C) of 2.0%, which is different from the dosage in the other cases of 2.2%, was chosen because the results obtained had grown worse by increasing the dosage above the value, i.e. 2.0%, which was the case also in the following Examples 18 to 20.

TABLE XX

| | Particulars of Flocculant Used | | |
|---|---|---|---|
| Denotation | Compound | Viscosity | Colloid Equivalent (meq/g) |
| (I) | Acetic acid salt of chitosan | 80 cP (0.5% aq. soln.) with B-type viscometer at 30 rpm. | 4.2 |
| (II) | Mannich-reactioned polyacrylamide | $[\eta]\,^{30°\,C}_{1N-NaCl} = 6.4$ | 3.2 |
| (III) | A homopolymer of dimethylaminoethyl methacrylate quaternized with methyl chloride | $[\eta]\,^{30°\,C}_{1N-NaCl} = 5.4$ | 4.8 |
| (IV) | A homopolymer of dimethylaminoethyl methacrylate quaternized with methyl chloride | $[\eta]\,^{30°\,C}_{1N-NaCl} = 3.5$ | 4.8 |
| (V) | Copolymer of acrylamide and dimethylaminoethyl methacrylate quaternized with methyl chloride | $[\eta]\,^{30°\,C}_{1N-NaCl} = 8.7$ | 3.1 |
| (VI) | Sodium salt of polyacrylic acid | $[\eta]\,^{30°\,C}_{2N-NaOH} = 6.6$ | −10.6 |
| (VII) | Partially hydrolyzed polyacrylamide | $[\eta]\,^{30°\,C}_{1N-NaCl} = 18.4$ | −4.3 |

TABLE XX-continued

| | Particulars of Flocculant Used | | |
|---|---|---|---|
| Denotation | Compound | Viscosity | Colloid Equivalent (meq/g) |
| (VIII) | Sodium carboxymethyl cellulose | $[\eta]_{0.1N-NaCl}^{30°C.} = 12.3$ | −3.2 |

TABLE XXI

Suspended Solids Capture for the Cakes plotted in FIG. 14

| Plot in FIG. 14 | Suspended Solids Capture (wt. %) | Plot in FIG. 14 | Suspended Solids Capture (wt. %) | Plot in FIG. 14 | Suspended Solids Capture (wt. %) |
|---|---|---|---|---|---|
| $A_1$ | 99 | $B_1$ | 99 | $C_1$ | 98 |
| $A_2$ | 99 | $B_2$ | 99 | $C_2$ | 95 |
| $A_3$ | 99 | $B_3$ | 98 | $C_3$ | 93 |
| $A_4$ | 99 | $B_4$ | 97 | $C_4$ | 90 |
| $A_5$ | 98 | $B_5$ | 93 | $C_5$ | 81 |
| $A_6$ | 98 | | | | |
| $A_7$ | 97 | | | | |
| $A_8$ | 97 | | | | |

In FIG. 14, the plot point $C_4$ represents the extreme limit of effective squeezing pressure taking into account the results of suspended solids capture and of exfoliation index. The plot point $C_5$ indicates that a further increase of squeezing pressure will never result in a substantial further improvement in the moisture content and in the exfoliative aspect as well. As for the cases of (A) and (B), by increasing the squeezing pressure, the moisture content of the dewatered cake can be decreased to a considerable measure, while the value for the suspended solids capture tends somewhat to decrease. Judging from the experimental results for the moisture content of dewatered cake and the yield of capture of suspended solids, the limit of effective squeezing pressure for the case (B) lies at the point $B_5$ (corresponding to the squeezing pressure of 2.5 kg/cm$^2$) and that for the case (A) at 7 kg/cm$^2$.

Example 18

A mixture (pH=4.8, SS=1.71% with VSS proportion=79.3%) of an excess sludge and primarily settled sludge from a sewage work was examined in a similar manner as in Example 17 at a sludge dewatering rate of 85 kg dry solids/m. hr. The experiments were conducted for three cases, in which (D) 0.6% by weight, based on SS content, of flocculant (I) of Table XX was employed for the first flocculant and 0.3% by weight, based on SS, of the flocculant (VI) of Table XX was employed for the second flocculant; (E) 0.6% by weight, based on SS, of the flocculant (V) Table XX was used for the first flocculant and 0.3% by weight, based on SS, of the flocculant (VII) was used for the second flocculant; and as a comparison experiment, (F) 0.7% by weight, based on SS, of the flocculant (III) in Table XX only was added to the second agitation tank. The experimental results for the moisture content in the dewatered cake are given in FIG. 15 in a graphic illustration and those for the suspended solids capture corresponding to each plot point in the graph are given in Table XXII.

TABLE XXII

Figure 15:
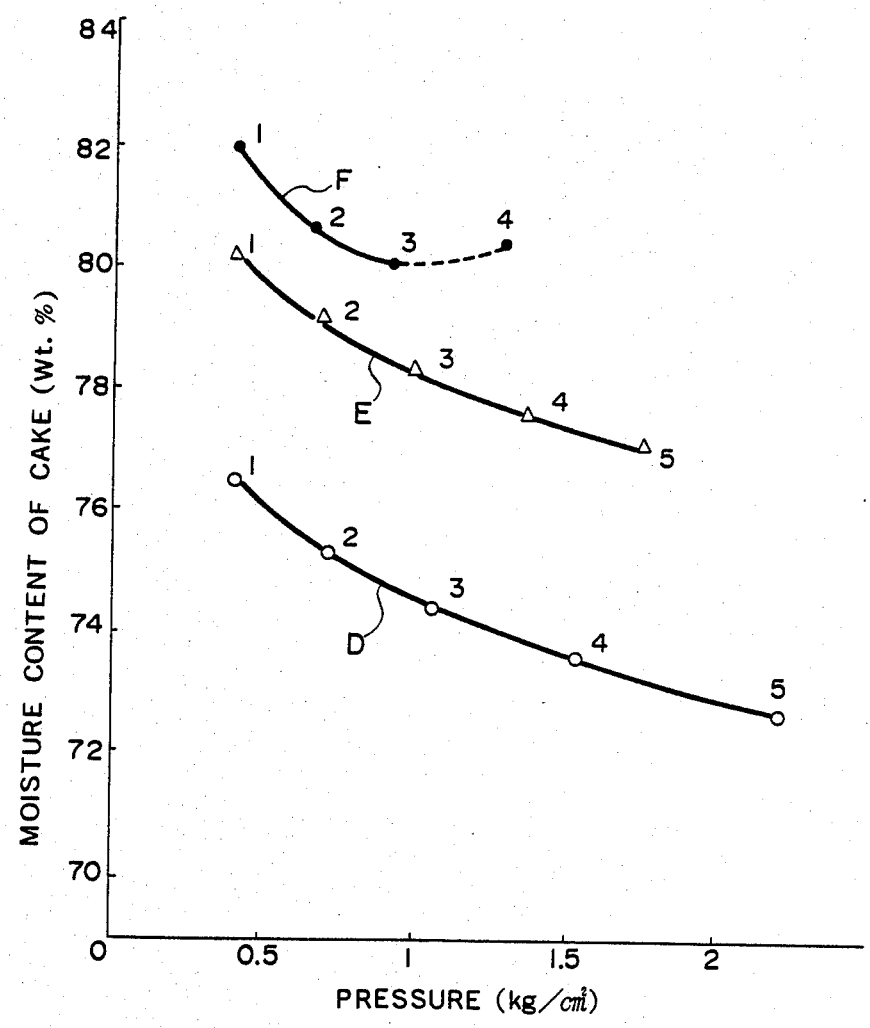

Suspended Solids Capture for the Cakes plotted in FIG. 15

| Plot in FIG. 15 | Suspended Solids Capture (wt. %) | Plot in FIG. 15 | Suspended Solids Capture (wt. %) | Plot in FIG. 15 | Suspended Solids Capture (wt. %) |
|---|---|---|---|---|---|
| $D_1$ | 99 | $E_1$ | 99 | $F_1$ | 98 |
| $D_2$ | 99 | $E_2$ | 99 | $F_2$ | 96 |
| $D_3$ | 99 | $E_3$ | 98 | $F_3$ | 92 |
| $D_4$ | 99 | $E_4$ | 97 | $F_4$ | 83 |
| $D_5$ | 99 | $E_5$ | 94 | | |

Example 19

An excess sludge from an activated sludge treatment of waste water from a food factory (pH=6.1, SS=1.94% with VSS %=76.7%) was dewatered in a similar manner as in Example 17 at a sludge dewatering rate of 95 kg dry solids/m. hr. The experiments were conducted for four cases, in which (G) 1.3% by weight, based on SS, of the flocculant (IV) of Table XX was used for the first flocculant and 0.7% by weight, based on SS, of the flocculant (VIII) of Table XX was used for the second flocculant; (H) 1.3% by weight, based on SS, of the flocculant (IV) of Table XX was used for the first flocculant and 0.7% by weight, based on SS, of the flocculant (VI) of Table XX was used for the second flocculant; (J) 1.1% by weight, based on SS, of the flocculant (III) of Table XX was used for the first flocculant and 0.7% by weight, based on SS, of the flocculant (VIII) of Table XX was used for the second flocculant; and as a comparison experiment, (K) 1.0% by weight, based on SS, of the flocculant (III) of Table XX was used alone. The experimental results for the moisture content of dewatered cake are given in FIG. 16 in a graphic illustration and those for the suspended solids capture corresponding to each plot point in the graph are given in Table XXIII.

TABLE XXIII

Figure 16:
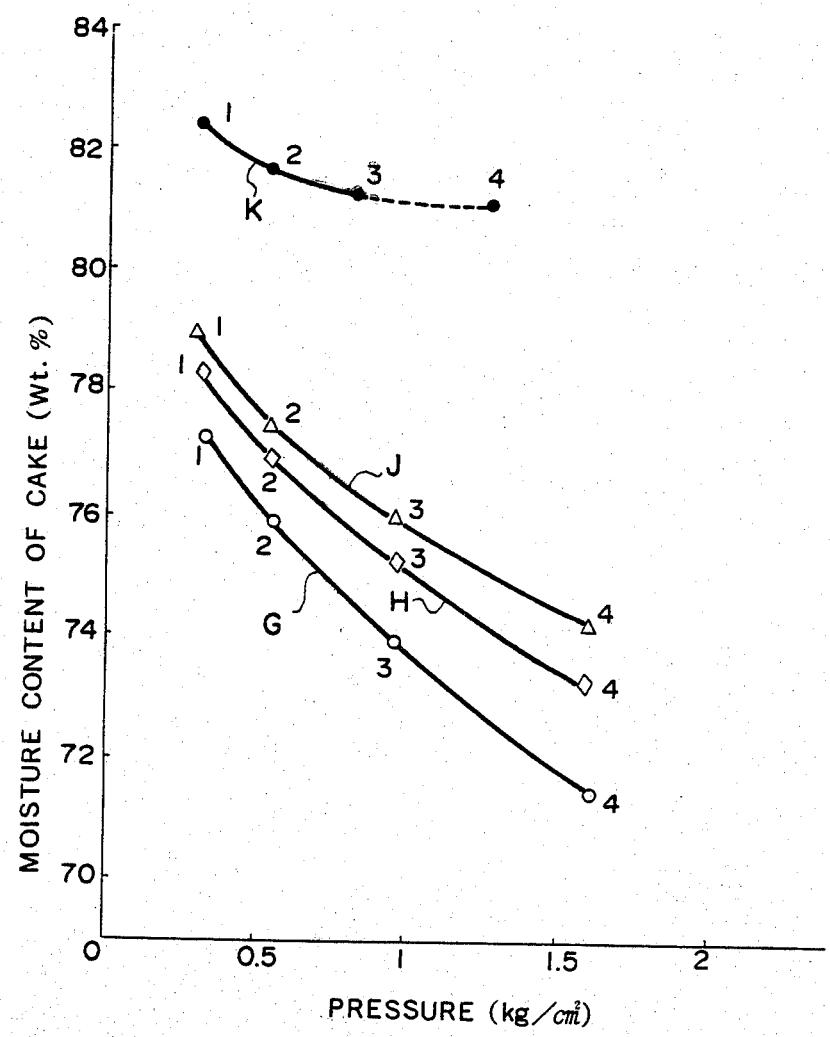

Suspended Solids Capture for the Cakes plotted in FIG. 16

| Plot in FIG. 16 | Suspended Solids Capture (wt. %) | Plot in FIG. 16 | Suspended Solids Capture (wt. %) | Plot in FIG. 16 | Suspended Solids Capture (wt. %) | Plot in FIG. 16 | Suspended Solids Capture (wt. %) |
|---|---|---|---|---|---|---|---|
| $G_1$ | 99 | $H_1$ | 99 | $J_1$ | 99 | $K_1$ | 99 |
| $G_2$ | 99 | $H_2$ | 99 | $J_2$ | 99 | $K_2$ | 98 |
| $G_3$ | 99 | $H_3$ | 99 | $J_3$ | 99 | $K_3$ | 96 |
| $G_4$ | 99 | $H_4$ | 99 | $J_4$ | 99 | $K_4$ | 86 |

As can be seen, while in all the comparison experiments (cases C, F and Ka), squeezing pressure of 1 kg/cm$^2$ cannot be exceeded, all the experiments according to the present invention can attain such a squeezing pressure and, above all, when at least one of the first and second flocculants consists of a natural high molecular organic compound or a derivative of such compound, a far higher squeezing pressure can be attained. As for the moisture content and the suspended solids capture, it is also seen that the experiments according to the present invention offered better results as compared with the comparisons and, in particular, when a natural high molecular organic compound or a derivative of such compound was employed for at least one of the first and the second flocculants, the superiority became more pronounced.

Example 20

Using dosages of the flocculant (I) of Table XX as the first flocculant in an amount of 1.0% by weight, based on SS, and the flocculant (VI) of Table XX as the second flocculant in an amount of 0.5% by weight, based on SS, an excess sludge from an oxidative treatment of nightsoil (pH=6.8, SS=1.86% with VSS %=83.4%) was examined for dewatering in nearly the same manner as in Example 17. In the experiment, the agitation intensity in the first stage agitation was changed within the range of rate of revolution of impeller of from 25 rpm to 250 rpm (corresponding to the range of circumferential velocity of from 0.5 to 5 m/sec), so as to observe the influence upon the average size of the resulting floc after agitation. The size of the floc was determined by microscopic photograph. All other conditions were the same as in Example 17. The dewatering was performed at a travelling velocity of the filter cloth of 0.4 m/sec. and a sludge dewatering rate of 60 kg dry solids/m.hr, under pressure varied for each level of agitation intensity in the first stage agitation. The observed data for the suspended solids capture and for the moisture content of dewatered cake is given in FIG. 17 in graphic illustrations.

The data for the average floc diameter after the first stage agitation observed in this experiment is recited in Table XXIV in relation to the corresponding curves in FIG. 17.

TABLE XXIV

| Explanation of Curves in FIG. 17 | | | | |
| --- | --- | --- | --- | --- |
| | Average Floc-Diam. after 1st Stage Agitation (mm) | | | |
| | 0.7 | 1.8 | 2.2 | 3.1 |
| Suspended Solids Capture | $L_1$ | $M_1$ | $N_1$ | $P_1$ |
| Moisture Content of Cake | $L_2$ | $M_2$ | $N_2$ | $P_2$ |
| Symbol of Plots | ◉ | ○ | ◇ | □ |

The curves $N_1$, $N_2$, $P_1$ and $P_2$ of FIG. 17 indicate that a further increase in either the squeezing pressure or the sludge dewatering rate would be futile, since the suspended solids capture rate decreases with increases of the squeezing pressure.

As can be seen, a dewatering operation at a pressure over 1 kg/cm$^2$ is made possible when the first stage agitation is performed with high intensity so as not to form a floc having an average floc size greater than 2 mm (inclusive of the case in which no flocculation occurs) in order to cause substantial neutralization of the charge of sludge particles, whereby it is also possible to increase the sludge dewatering rate.

Example 21

Using a mixture (pH=6.1, SS=2.06% with VSS proportion=63%) of primarily settled sludge and excess sludge from an activated sludge treatment of sewage water, dewatering experiments were conducted. In case I, a cationic flocculant among those given in Table XXV was added as the first flocculant to the suction side of a centrifugal pump transporting the sludge mixture to the HYDOPRESS, so as to effect the first stage intense agitation in the pump. In case II, said first flocculant was added in a first agitation tank disposed on the delivery side of the pump and equipped with an agitating impeller operated at a rate of revolution of 25 rpm (corresponding to a circumferential velocity of 0.5 m/sec.) to cause an ordinary mild agitation. Each sludge mixture treated as above was then conducted into a second agitation tank (retention time=2 minutes) also equipped with an agitating impeller, and the second stage agitation was carried out there with mild intensity with addition of an anionic flocculant selected from those given in Table XXV as the second flocculant by operating the impeller at a rate of revolution of 25 rpm (corresponding to a circumferential velocity of 0.5 m/sec.) so as to cause flocculation. Each flocculated sludge mixture was then supplied to the squeezing filtration dehydrator of belt press type as employed in Example 16, to effect dewatering. The dewatering was carried out at a filter cloth travelling velocity of 0.96 m/min., under a tension of the filter cloth of 7 kg/cm and at a sludge dewatering rate of 100 kg-dry solids/m.hr. The results of observations of the moisture content of dewatered cake and the yield of suspended solids capture are summarized in Table XXVI.

TABLE XXV

| Particulars of the Flocculant Used | | | |
| --- | --- | --- | --- |
| Denotation | compound | Viscosity | Colloid Equivalent (meq/g) |
| C-1 | Homopolymer of dimethylaminoethyl methacrylate quaternized with methyl chloride | $[\eta]\,^{30°\,C.}_{1N-NaCl} = 4.9$ | 4.8 |
| C-2 | Copolymer of acrylamide and dimethylaminoethyl methacrylate quaternized with methyl chloride | $[\eta]\,^{30°\,C.}_{1N-NaCl} = 6.1$ | 3.1 |
| C-3 | Mannich-reaction polyacrylamide | $[\eta]\,^{30°\,C.}_{1N-NaCl} = 6.0$ | 3.3 |
| C-4 | Polyethyleneimine | (M.W. = 100,000) | 18 |
| C-5 | Acetic acid salt of chitosan | 80 cP (0.5% aq. siln.) with B-type viscometer at 30 rpm. | 4.2 |

TABLE XXV-continued

| | Particulars of the Flocculant Used | | |
|---|---|---|---|
| Denotation | compound | Viscosity | Colloid Equivalent (meq/g) |
| A-1 | Sodium polyacrylate | $[\eta]^{30°C}_{2N-NaOH} = 7.2$ | −10.6 |
| A-2 | Partially hydrolyzed polyacrylamide | $[\eta]^{30°C}_{1N-NaCl} = 19.3$ | −2.9 |
| A-3 | Terpolymer of sodium 2-acrylamido-2-methylpropanesulfonate, sodium acrylate and acrylamide (charged mole ratio: 4/26/70) | $[\eta]^{30°C}_{1N-NaCl} = 17.6$ | −3.6 |

TABLE XXVI

Results of Sludge Dewatering Test

| Flocculants used | Dosage of each Flocculant (both in % to SS) | Condition of Addition | Floc-Diameter after Addition of cationic Flocculant (mm) | Moisture Cont. of dewatered Cake (wt. %) | Suspended Solids Capture (wt. %) |
|---|---|---|---|---|---|
| C-1/A-1 | 0.95/0.40 | I | 1.7 | 76.4 | 99 |
| | | II | 4.2 | 82.4 | 94 |
| C-2/A-1 | 0.95/0.40 | I | 1.7 | 77.8 | 98 |
| | | II | 4.6 | 83.6 | 90 |
| C-3/A-3 | 0.95/0.40 | I | 1.5 | 75.6 | 99 |
| | | II | 4.0 | 81.3 | 96 |
| C-4/A-2 | 2.10/0.40 | I | 1.1 | 73.5 | 97 |
| | | II | 2.7 | 78.4 | 95 |
| C-5/A-1 | 0.95/0.40 | I | 1.3 | 72.0 | 99 |
| | | II | 2.2 | 76.3 | 97 |

Example 22

Using a sludge in alum coagulation of waste water from a paper and kraft pulp mill (pH=5.3, SS=2.68% with VSS proportion of 64.8%), a dewatering experiment was carried out in a manner similar to Example 21. As the first flocculant, an anionic flocculant given in Table XXV and, as the second flocculant, a cationic flocculant given in Table XXV were employed. The sludge dewatering rate was set to 125 kg-dry solids/m.hr. Other conditions were the same as in Example 21. The results obtained are shown in Table XXVII.

TABLE XXVII

Results of Sludge Dewatering Test

| Flocculants used | Dosage for each Flocculant (both in % to SS) | Condition of Addition | Floc-Diameter after Addition of anionic Flocculant (mm) | Moisture Content of dewatered Cake (wt. %) | Suspended Solids Capture (wt. %) |
|---|---|---|---|---|---|
| A-1/C-1 | 0.75/0.56 | I | 1.5 | 75.0 | 99 |
| | | II | 3.2 | 80.6 | 94 |
| A-2/C-3 | 0.75/0.56 | I | 1.7 | 76.5 | 99 |
| | | II | 5.4 | 82.1 | 92 |
| A-1/C-5 | 0.75/0.56 | I | 1.5 | 73.1 | 99 |
| | | II | 3.2 | 77.4 | 96 |

When the first flocculant was charged on the suction side of the pump to effect intense agitation thereof by the pump, the floc size was smaller as compared with the case in which the first stage agitation was conducted in the first agitation tank, the latter resulting in an increase in the moisture content of the dewatered cake and a decrease in the yield of suspended solids capture. This effect was greater when a natural high molecular organic compound was employed.

What is claimed is:

1. A process for dewatering an aqueous sludge consisting essentially of water and suspended solid particles which have ionic charges of a first polarity, which comprises the steps of: in a first stage, adding to said sludge an effective amount of a first, water-soluble, organic flocculant that provides in said sludge ionic charges of a second polarity opposite to said first polarity, and simultaneously intensely agitating said sludge under conditions effective to completely neutralize the ionic charges of said suspended solid particles and to prevent formation of flocs having an average size greater than 2 mm; then, without removing water from said sludge, in a second stage, adding to said sludge obtained from said first stage an effective amount of a second, water-soluble, organic flocculant that provides in said sludge ionic charges of said first polarity, and simultaneously agitating said sludge under milder mixing conditions than those used in said first stage and which are effective to flocculate said sludge to form large flocs having a larger floc size than any flocs formed in said first stage and which large flocs are non-sticky to the touch; and then subjecting the flocculated sludge obtained from said second stage to a mechanical dewatering operation, wherein at least one of said flocculants is selected from the group consisting of (a) an anionic organic flocculant selected from the group consisting of carboxymethyl cellulose, sodium alginate and carboxymethyl starch, and (b) a cationic organic flocculant selected from the group consisting of cationized starch, cationized cellulose, cationized guar gum and water-soluble salts of chitosan.

2. A process according to claim 1, wherein one of said first and second organic flocculants is a water-soluble salt of chitosan and the other is polyacrylic acid or a salt thereof.

3. A process according to claim 1 in which said aqueous sludge contains sulfate ions, and wherein, in said first stage, said first organic flocculant is selected from the group consisting of water-soluble salts of chitosan and polyethyleneimine, and wherein a salt selected from the group consisting of calcium chloride, magnesium chloride and barium chloride is added to said aqueous sludge before or at the same time as said first organic flocculant.

4. A process according to claim 1, wherein the dewatering operation is carried out by pressing the flocculated sludge against a filter cloth under a pressure of at least 1 Kg/cm$^2$.

5. A process according to claim 4, wherein the pressing is carried out by a belt press dehydrator or a filter press dehydrator.

6. A process according to claim 1 in which said mechanical dewatering operation is centrifugation.

7. A process according to claim 1 in which said mechanical dewatering operation is vacuum filtration.

8. A process according to claim 1 in which said mechanical dewatering operation is press filtration.

9. A process for dewatering an aqueous sludge consisting essentially of water and suspended solid particles which have ionic charges of a first polarity, which consists essentially of the steps of: in a first stage, adding to said sludge a first, water-soluble, organic flocculant that provides in said sludge ionic charges of a second polarity opposite to said first polarity, and simultaneously intensely agitating said sludge under conditions effective to completely neutralize the ionic charges of said suspended solid particles and to prevent formation of flocs having an average size greater than 2 mm; then, without removing water from said sludge, in a second stage, adding to said sludge obtained from said first stage a second, water-soluble, organic flocculant that provides in said sludge ionic charges of said first polarity, and simultaneously agitating said sludge under milder mixing conditions than those used in said first stage and which are effective to flocculate said sludge to form large flocs having a larger floc size than any flocs formed in said first stage and which large flocs are non-sticky to the touch; and then subjecting the flocculated sludge obtained from said second stage to a mechanical dewatering operation by pressing same against a filtering medium under a pressure of at least 1 Kg/cm$^2$, using a belt press dehydrator or a filter press dehydrator, so that the flocs are retained on the filter medium, and recovering the dewatered flocs from the filter medium; wherein (1) one of said flocculants is a cationic organic flocculant and the amount of said cationic organic flocculant is from 0.5 to 6% by weight, based on the weight of suspended solids in said sludge, (2) the other of said flocculants is an anionic organic flocculant and the amount of said anionic organic flocculant is from 0.2 to 3% by weight, based on the weight of suspended solids in said sludge and (3) at least one of said first and second flocculants is selected from the group consisting of (a) an anionic organic flocculant selected from the group consisting of carboxymethyl cellulose, sodium alginate and carboxymethyl starch, and (b) a cationic organic flocculant selected from the group consisting of cationized starch, cationized cellulose, cationized guar gum and water-soluble salts of chitosan.

10. A process according to claim 1 or claim 9, wherein substantially no flocs are formed during said first stage.

11. A process according to claim 1 or claim 9 wherein said sludge is selected from the group consisting of primary settled sewage sludge, excess activated sludge, digested sludge and alum coagulation sludge.

* * * * *